US011433289B2

(12) United States Patent
Mann et al.

(10) Patent No.: US 11,433,289 B2
(45) Date of Patent: Sep. 6, 2022

(54) SYSTEM AND APPLICATION FOR COURSE-SPECIFIC TRAINING USING TERRAIN SIMULATION AND CROWDSOURCED COURSE DATA

(71) Applicant: Runbetter LLC, Chicago, IL (US)

(72) Inventors: Nicole Mann, Chicago, IL (US); Chris Wehrman, Chicago, IL (US); Curtis Mann, Chicago, IL (US)

(73) Assignee: Runbetter LLC, Chicago, IL (US)

( * ) Notice: Subject to any disclaimer, the term of this patent is extended or adjusted under 35 U.S.C. 154(b) by 0 days.

(21) Appl. No.: 16/490,217

(22) PCT Filed: Mar. 1, 2018

(86) PCT No.: PCT/US2018/020540
§ 371 (c)(1),
(2) Date: Aug. 30, 2019

(87) PCT Pub. No.: WO2018/160900
PCT Pub. Date: Sep. 7, 2018

(65) Prior Publication Data
US 2021/0379469 A1    Dec. 9, 2021

Related U.S. Application Data

(60) Provisional application No. 62/567,375, filed on Oct. 3, 2017, provisional application No. 62/507,507, filed on (Continued)

(51) Int. Cl.
*A63B 71/06*    (2006.01)
*A63B 22/02*    (2006.01)
*A63B 24/00*    (2006.01)

(52) U.S. Cl.
CPC .......... *A63B 71/0622* (2013.01); *A63B 22/02* (2013.01); *A63B 24/0075* (2013.01);
(Continued)

(58) Field of Classification Search
None
See application file for complete search history.

(56) References Cited

U.S. PATENT DOCUMENTS

2009/0209393 A1*  8/2009  Crater ............ G01S 19/19
                                                   482/9
2011/0319229 A1   12/2011  Corbalis et al.
(Continued)

FOREIGN PATENT DOCUMENTS

KR    10-2012-0132268    12/2012

OTHER PUBLICATIONS

International Search Report and Written Opinion for corresponding PCT Application PCT/US2018/020540 dated Jun. 21, 2018, 9 pages.

*Primary Examiner* — Sundhara M Ganesan
*Assistant Examiner* — Shila Jalalzadeh Abyaneh
(74) *Attorney, Agent, or Firm* — Daly, Crowley, Mofford & Durkee, LLP

(57) ABSTRACT

Systems and applications, e.g., software applications running on mobile devices such as smart phones, tablets, and the like, are described that provide for terrain-based simulation of particular desired or selected running/walking courses, e.g. a race course or a non-race jogging/training route, on a treadmill. The terrain-based simulation can include providing instructions for the user for making adjustments and/or settings of the treadmill to simulate changes that a runner/jogger/walking person would encounter on the actual selected course due to the actual changes of terrain on that course. The terrain-based adjustments and/or settings can include the incline/decline of the treadmill surface, e.g., along the long axis or parallel to the moving surface, and/or effort required to move the treadmill surface. Other adjustments and/or settings can be used in addition to
(Continued)

or instead of any of the previously described ones to further simulate conditions of a selected course.

11 Claims, 14 Drawing Sheets

Related U.S. Application Data on May 17, 2017, provisional application No. 62/465,776, filed on Mar. 1, 2017.

(52) U.S. Cl.
CPC . *A63B 2071/065* (2013.01); *A63B 2071/0638* (2013.01); *A63B 2071/0675* (2013.01)

(56) References Cited

U.S. PATENT DOCUMENTS

| | | | |
|---|---|---|---|
| 2012/0237911 A1* | 9/2012 | Watterson | G10L 15/26 482/4 |
| 2013/0210579 A1* | 8/2013 | Schieffer | A63B 71/0622 482/8 |
| 2013/0274066 A1* | 10/2013 | Ashby | A63B 24/0062 482/4 |
| 2014/0113770 A1* | 4/2014 | Yim | A63B 69/0057 482/8 |
| 2015/0098021 A1* | 4/2015 | O'Sullivan | H04N 21/4223 348/516 |
| 2016/0107065 A1 | 4/2016 | Brammer et al. | |
| 2016/0250519 A1* | 9/2016 | Watterson | A63B 24/0084 482/4 |

\* cited by examiner

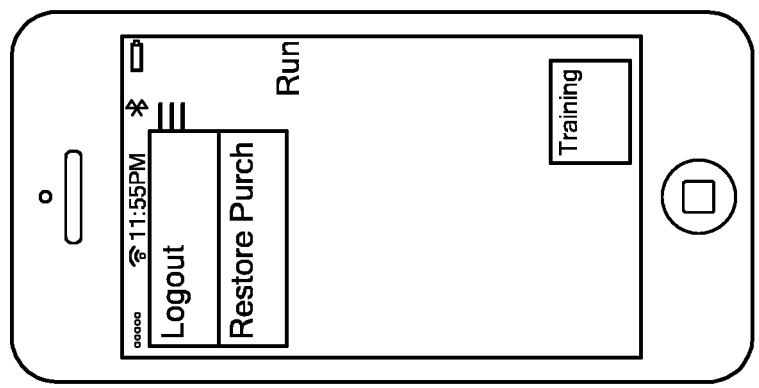
Figure 1D System Menu
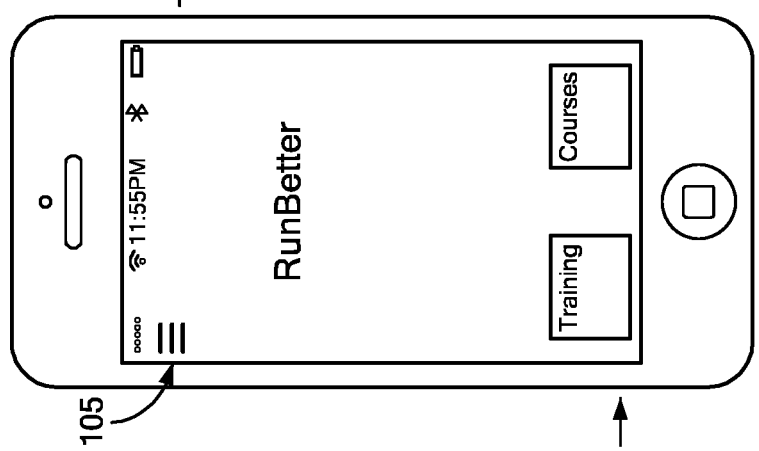
Figure 1C Home Page
Figure 1B Login
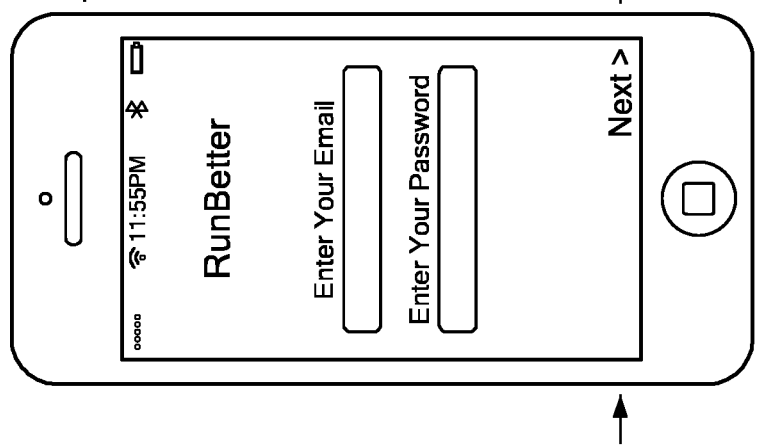
Figure 1A Registration Training Document Detail Purchase Training Document Training Document Overview Active Course Purchase Course Course Overview Active Course - Updated Active Course - Update Start/End

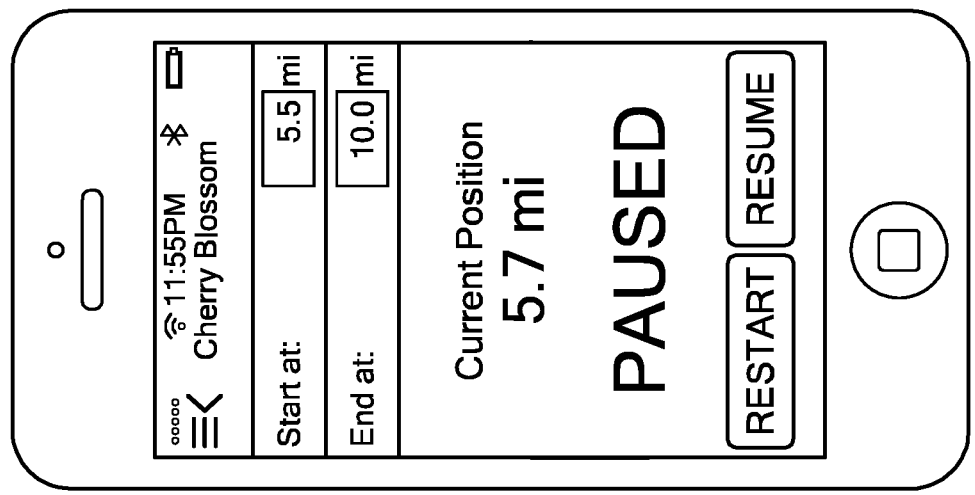
Figure 3H — Active Course - Paused
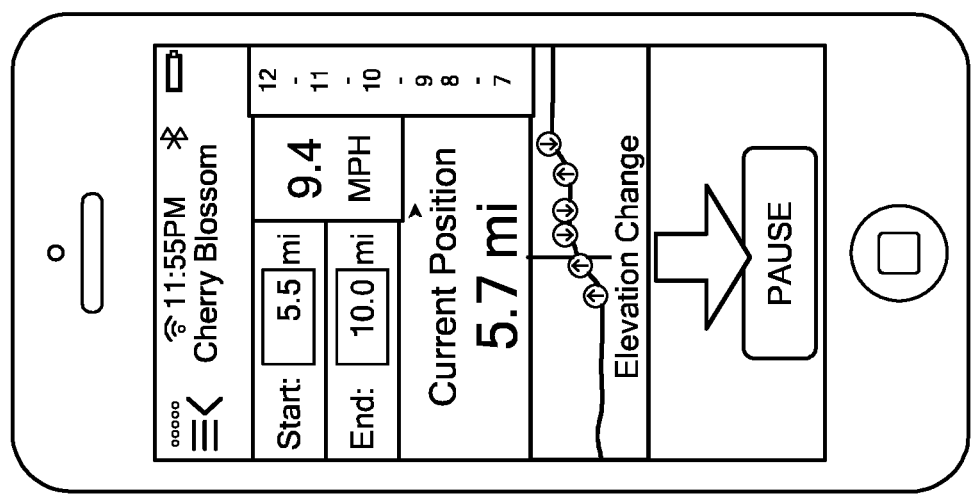
Figure 3G — Active Course - Elevation Up/Down
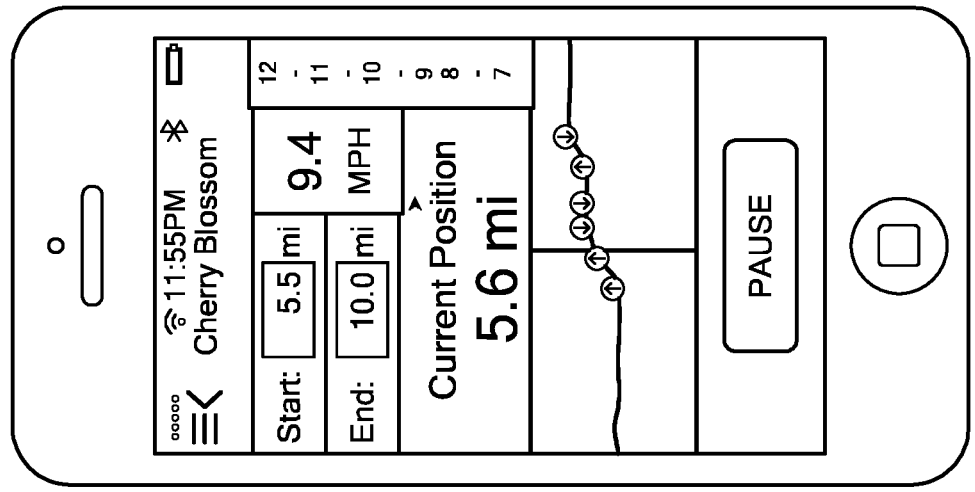
Figure 3F — Active Course - Running

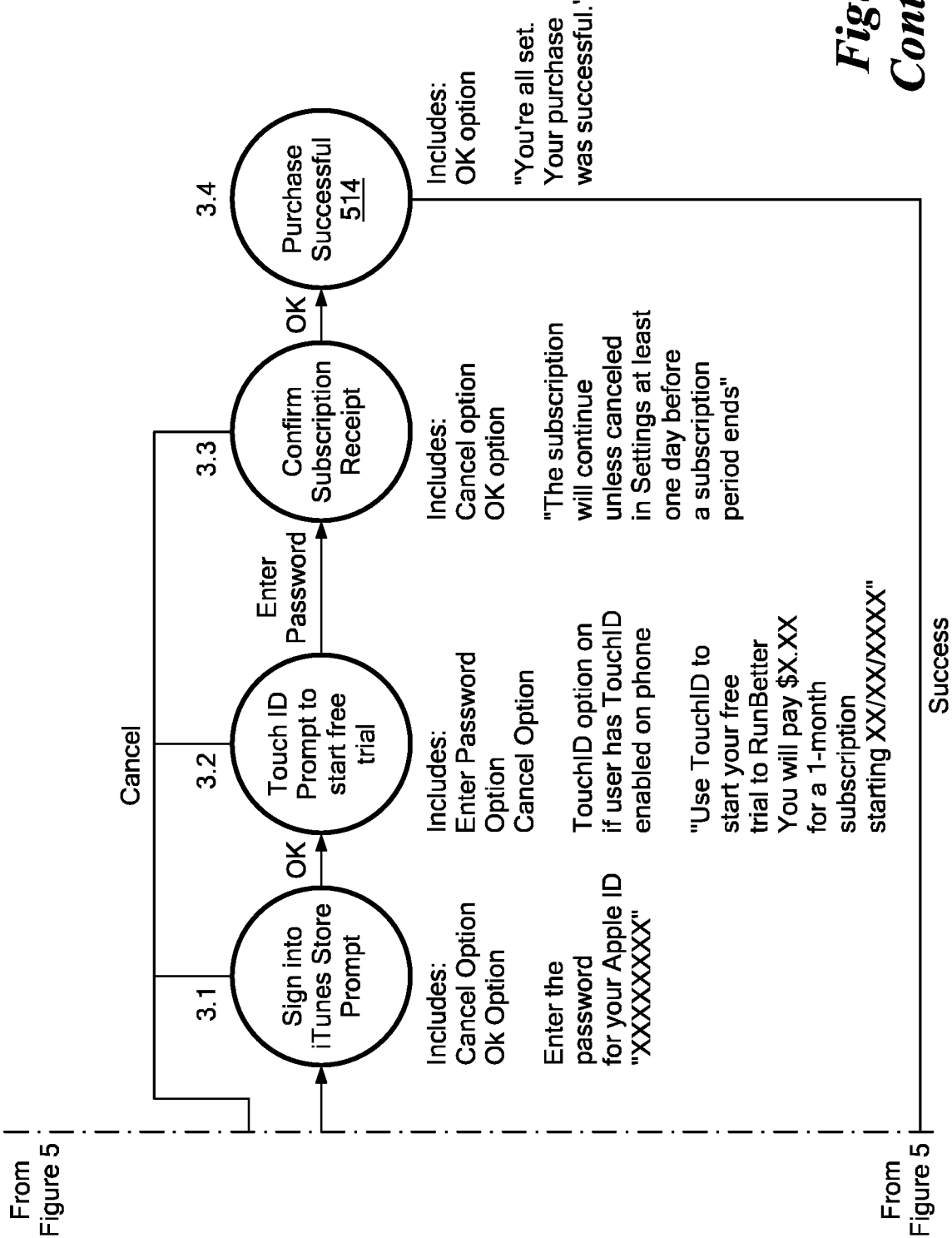

SYSTEM AND APPLICATION FOR COURSE-SPECIFIC TRAINING USING TERRAIN SIMULATION AND CROWDSOURCED COURSE DATA

RELATED APPLICATIONS

This application is the National Stage of International Application No. PCT/US2018/020540, filed on Mar. 1, 2018, which claims the benefit of and priority to the following related applications: U.S. Provisional Patent Application No. 62/465,776 filed 1 Mar. 2017 and entitled "System and Application for Terrain-Based Course Simulation"; U.S. Provisional Patent Application No. 62/507,507 filed 17 May 2017 and entitled "System and Method for Course-Specific Training Using Terrain Simulation and Crowdsourced Course Data"; and, U.S. Provisional Patent Application No. 62/567,375 filed 3 Oct. 2017 and entitled "System and Method for Course-Specific Training Using Terrain Simulation and Crowdsourced Course Data"; the entire content of each of which is incorporated herein by reference.

BACKGROUND

Runners typically train for races by running designated distances at a specific pace for a period of time preceding the race. A runner's training regimen for a specific race can be performed outdoors or indoors and may include training techniques to maximize a runner's performance for a specific race or race course. In addition, a variety of training devices or training tools are available to runners, such as treadmills, biometric monitors, pedometers, and specific training regimens prescribing distance, speed and time goals to maximize a runner's performance for a particular race or race course.

SUMMARY

The subject technology described in the present disclosure and in the attached exhibits presents systems, methods, and applications (e.g., software applications running on mobile devices such as smart phones) that provide course-specific training and coaching using simulated terrain data and/or crowdsourced terrain data. The disclosure discusses course-specific training and coaching utilizing simulated terrain data associated with a desired or selected course (e.g. a course over which a race is run or a route over which a runner runs or trains) and crowdsourced terrain data which has been provided by and is shared among a community of system and application users. The disclosure provides details and explains how simulated terrain data and crowdsourced terrain data are provided to engage a runner training for a specific-course on any treadmill.

The systems, methods, and applications discussed herein process the terrain data and generates adjustments and/or settings for speed (or pace), distance, and elevation (e.g., incline/decline) for the user to input into any treadmill. Using the systems, methods and/or applications, a user can adjust any treadmill for any course. The systems, methods, and applications do not require a specialized treadmill configured to receive adjustments and/or settings input by other means, such as transferred or downloaded to the treadmill from a wireless device or otherwise attached computer. The systems, methods, and applications operate to engage the runner, not the treadmill, for the input the adjustments and/or settings that are generated for a specific course. In this way, the runner can travel to any location and utilize any treadmill to perform a simulated real world run using the adjustments and/or settings generated by the system and application for the runner to provide as input to any treadmill.

The systems, methods, and applications are configured to receive and process simulated terrain data for a course and generate adjustments and/or settings for a user to input to a treadmill to mimic the actual course conditions. A user can select a course to train on from a library of courses available in the application. For example, the library of courses may include terrain data associated with famous marathon courses in the United States, such as the Boston Marathon or New York City Marathon. A user can also record and share a training run on a specific course and upload the course to a course library to be shared with other users. A user can select a starting point for their training which may reflect the starting point of the actual course at the appropriate elevation or may be a location that is along the route of the course with the corresponding appropriate elevation. Similarly, users can select the finish point for their training which may reflect the finish point of the actual course at the appropriate elevation or may be a location that is along the route of the course with the corresponding appropriate elevation. In some implementations, a user may drag a starting or finish point icon to a location on the map showing the entire course as a means to set or specify the start and finish point, respectively. The user's position on the course can be tracked internally and linked to the specific course.

The simulated terrain data can be processed by the system and application to generate adjustments and/or settings of the treadmill to simulate changes that a runner or user would encounter on the actual selected course that correspond to the actual terrain changes on that course. The adjustments and/or settings can include the incline/decline of the treadmill surface and/or speed or pace required to achieve a particular time or pace for the course. Other adjustments and/or settings can be generated by the system and application in addition to or instead of those previously described above. For example, the system and application may generate adjustments and/or settings for a treadmill or a specialized training system configured to include a treadmill. In this example, the system and application may generate adjustments and/or settings that further simulate conditions of a selected course such as side-to-side or lateral incline/decline of the treadmill surface, available oxygen content, and/or humidity (which may include sprayed water to mimic rain and wind), and the like.

Course-specific data can also be incorporated into the system and application by crowdsourcing a community of users. Crowdsourcing is a specific sourcing model in which work is divided between participants to achieve a cumulative result. In the disclosed system and application, crowdsourcing enables users or runners from anywhere to submit a course and the associated terrain data that represent courses the user has run or courses for which the user can access based on previously running the course or previous acquisition of the course terrain data. The crowdsourced terrain data can also be processed by the system and application to generate adjustments and/or settings of the treadmill to simulate changes that a runner or user would encounter on the crowdsource supplied course. Additionally, or alternatively, a professional runner could upload or provide training data, via the crowdsource functionality, for their runs over specific or favored courses and enable a user to train or "Run with the Pros".

For example, crowdsourced terrain data may be uploaded to the system and application and made available in a library of courses. The crowdsourced terrain data can be utilized by other runners or users who would like to train or run the specific crowdsource supplied course. A user may purchase, download, or otherwise acquire the crowdsourced course, including its corresponding terrain data. The system or application can generate adjustments and/or settings corresponding to the actual terrain changes of the crowdsourced course for the user to enter as input into any treadmill.

In some implementations of the subject disclosure, the system and application operate to generate adjustments and/or settings of the treadmill based on the simulated terrain data or the crowdsourced terrain data for a selected course. The system and application can also generate and provide adjustments or settings that correspond to the changes in terrain elevation, as well as the altitude of the selected course. The system and application determine the adjustments or settings for the treadmill based on the actual terrain elevation data for the selected course (e.g., portions of the course which are inclined or declined), as well as the altitude at which the selected course occurs (e.g., a course occurring at sea-level or a course occurring at an elevation that is 7000 ft. above sea-level). For example, if a user has selected to train for a course that includes a persistent incline of 1% over the entire course, located in Denver, Colo. at an altitude of approximately 5280 ft. above sea-level, then the system and application generate adjustments and/or settings of treadmill incline to simulate the course terrain elevation and altitude in Denver, Colo. The system and application can generate adjustments and/or settings of treadmill incline to mimic the course elevation and altitude conditions and inform the user to increase the treadmill incline from 1% to 3% so that the user feels like she or he is running up a hill, in Denver.

In some implementations of the subject disclosure, the system and application can display the treadmill incline or decline settings to the user for manual input into any treadmill. In some implementations of the subject disclosure, the system and application can make the adjustments of treadmill incline or decline settings directly and without indicating that the user should make the adjustments. Additionally, or alternatively, the system and application can be configured to transmit the generated adjustments and/or settings to a watch or other mobile training device worn by a runner. Based on receiving the generated adjustments and/or settings at the watch or other mobile training device, the user can enter the adjustments and/or settings into any treadmill.

In some implementations of the subject disclosure, the systems, methods, and applications can generate adjustments and/or settings of other training devices or other treadmill settings to simulate conditions for a specific course. For example, the systems, methods, and applications can generate adjustments and/or settings for available oxygen to simulate training for a course at altitude. In this example, a user can train wearing a mask that controls the amount of oxygen the user is able to receive. The systems, methods, and applications can generate adjustments and/or settings to control the flow of oxygen to the runner via the mask and thereby mimic the available oxygen present at the course altitude. The systems, methods, and applications of the subject disclosure can control any suitable oxygen delivery or metering apparatus (e.g., control valves fed by oxygen tank(s) in a suitably sealed room). The system, methods, and applications of the subject disclosure can control available oxygen alone or in conjunction with other modes/techniques of simulating course training at altitude as described herein, e.g., setting or adjustment of the incline or decline.

The systems, methods, and applications of the subject disclosure can also be used to generate adjustments and/or settings of the treadmill that correspond to a course at an altitude lower than the location of training. For example, a runner training in Quito, Ecuador, elevation 9350 ft. or 2850 meters above sea level, who is training for the course occurring at a lower altitude (e.g., in Denver, Colo.) could receive adjustments and/or settings for the treadmill from the system and application that simulate the altitude of Denver in a converse manner, e.g., by decreasing an incline setting or increasing an available oxygen setting, or the like.

The systems, methods, and applications also include a coaching component. The coaching component may utilize simulated terrain data or crowdsourced terrain data to provide a user or runner with a specific training regimen for the specific course for which the user is training. The training regimen can identify a training plan including various workouts, which if performed preceding a race on the specific course, can maximize the user's performance when running a race on the same course. The training regimen includes a list of training runs to be performed over a period of time in advance of a race on the specific course. The training regimen also includes descriptions of the terrain data associated with the specific course as well as coaching instructions and advice for the user to follow in order to maximize race performance on the specific course. The training descriptions and instructions can include terrain attributes corresponding to the specific course such as, but not limited to, start/finish points, elevation data, pace to be run, as well as coaching instruction on how to perform the training runs identified in the training regimen. The coaching component also provides adjustments and/or settings of the treadmill that simulate changes a runner or user would encounter on the specific course the runner or user selected for coaching. For example, a coach may want to train track team members on a specific segment or portion of a course that is not geographically available in the team's local area. In this example, the coach may instruct the team members to select a particularly hilly segment of a course and train on that segment using the adjustments and/or settings generated by the system and application for that specific course segment. Additionally, or alternatively, users may input criteria such as average pace per mile or a target finish time and the coaching component can generate training regimens and workouts specifically tailed for a selected course based on the desired criteria sought to be achieved.

The systems, methods, and application can further be configured to enable users to utilize crowdsourced terrain data provided by professional runners and thereby allow users to "Run with a Pro". The system and application can be configured with a library of courses to receive and store terrain data associated with specific courses that have been submitted by users, shared by users, or downloaded from the internet. This functionality would enable elite, professional runners, for example, to upload terrain data associated with a specific or favorite course. A user can select the course submitted by the professional runner for their personal training. The system and application can generate adjustments and/or settings for the treadmill that simulate the start/finish points, distance, course elevation data, pace and other course or performance data associated with the course supplied by the elite runner. The user can train "with" or mirror the performance achieved by the professional runner on the same simulated course by utilizing the adjustments and/or settings generated by the system and application in order to allow the user to compare her or his performance against the professional runner. This functionality is not limited to comparison with elite or professional runners and can be configured for use between any two users of the application who would like to train with each other, against each other or share course data with each other. Additionally, or alternatively, users traveling to specific area of the country who are unfamiliar with the local terrain may search the library of courses to select a course of a specified distance, elevation or grade that has been uploaded by users who are local the area.

The systems, methods, and applications can be further configured to interoperate with a social media environment such as a web-page or forum-like environment allowing users to communicate with each other about their training and courses. This aspect of the system and application may include visual affordances describing a user's performance on a course including data such as a map of the completed course, duration of the training run and contact information allowing users to communicate with each other. Additionally, or alternatively, the system and application can further include a rewards program for users who select and train on courses tagged for inclusion in the rewards program. In this example, the community aspect of the system and application may grow based on competition for reward points earned by training on reward-eligible courses.

BRIEF DESCRIPTION OF THE DRAWINGS

The above and related features, and advantages of the present disclosure will be more fully understood by reference to the following detailed description, when taken in conjunction with the following figures, wherein:

FIGS. 1A-1D show illustrative implementations of an Application Registration interface, a Login interface, a Home Page interface, and System Menu interface, in accordance with the present disclosure.

FIGS. 3A-3H show illustrative implementations of an Application Course interfaces, in accordance with the present disclosure.

DETAILED DESCRIPTION

Figure 2C:
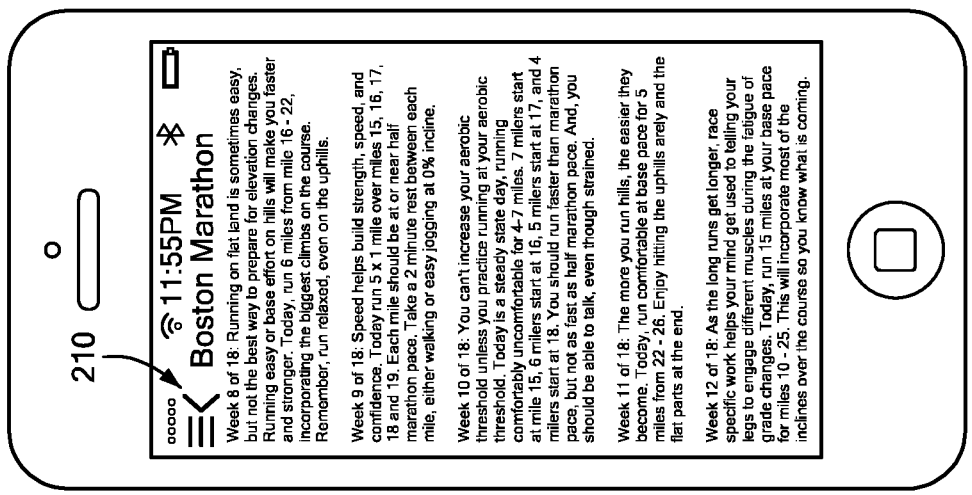
FIGS. 2A-2C show illustrative implementations of an Application Training interfaces, in accordance with the present disclosure.

Exemplary embodiments of the subject technology are referred to herein as a "Project" or "the Project." A Project can be a system and software application ("APP" or "App") that accesses and processes course-specific terrain data to generate incline and decline adjustments or settings of a treadmill allowing runners to train for specific race and non-race courses. The term "course" includes, without limitation, road races of all distances (e.g., 5 k, 10 k, 20 k, half marathon, marathon, ultra-marathons and trail runs, etc.), the run portion of any triathlon course of any distance (e.g., sprint, Olympic, Half Ironman and Ironman, etc.), and the run portion of any other event (e.g., Cross Fit or Tough Mudder course and similar events). A course may be divided into segments. Course data or course segment data include specific terrain data associated a given course or course segment such as course altitude, grade, distance, and the starting and finishing locations. Course meta-data can include the user who uploaded a course, the date the course was uploaded, and the date the training run was performed on that course. Courses can be stored in memory locally on the device for "off-line" use when the system and application are not connected to the internet. Exemplary embodiments of the App may be referred to as a "RunBetter App" or a "Mobile App."

An example of a system according to the present disclosure takes GPS data (or other positional data) from a variety of sources and produces, for user input to a treadmill machine, a set of adjusted incline and decline values that represent the same conditions as if the user was running on the selected course. The adjusted incline and decline values are then input to the treadmill by the user, e.g., either by hand or by connecting a wireless device containing the incline/decline data to the treadmill. The system and application can be configured to display the current course and location on the course in a simple, graphical way. A user can pause and resume a run. A user can change the pace as determined by the runner's speed in miles-per-hour.

The "Front End" or user interface of the system and application can include graphical user interface (GUI) features, such as buttons, toggles, sliders, notifications or other similar graphical affordances that are presented to engage the runner and facilitate the runner's interaction with the system and application to enter course adjustments and/or settings into any treadmill. Because the user is the primary input mechanism with the treadmill, the Front End can include various notification and alerting mechanisms to inform the user of an upcoming, immediate or past due adjustment and/or setting to be changed on the treadmill. In some implementations, the system and application can be configured to generate adjustments and/or settings using spoken instructions or verbal prompts that are provided to the user via voice or audio communication from the device on which the application is configured. In some implementations, the system and application may be configured with a map component to generate a visual representation of the user performing a run on the selected course. For example, the map component can generate visual affordances depicting the runner traveling along the selected course which are overlaid on a map of the course. Additionally, or alternatively, the visual affordances may update dynamically as the runner travels along the selected course. The map component can generate multiple views such as forward-looking, overhead, a view showing progress over the entire course or a hybrid view including one or more of the previously mentioned or alternate views. The system and application can be further distinguished over alternative solutions by the lack of a video component to display course surroundings. In contrast to alternative solutions which can include a video component, the system and application of the present disclosure actively engage the runner by providing adjustments and/or settings for the runner to input into any treadmill as opposed to more passive engagement methods, such as providing a video display of course conditions in whereby the runner is merely watching the video display of the course's conditions.

FIGS. 1A-1D illustrate example interface implementations of the application as implemented on a mobile device, e.g., as implemented in an "App" for use with a smartphone or other internet-connected device. FIGS. 1A-1D illustrate example implementations of a Registration interface, a Login interface, a Home Page interface, and a System Menu interface, respectively. FIG. 1A illustrates an exemplary Registration interface for the Application. The Registration interface or screen is displayed when the Application detects a first-time user (i.e., no users are registered in the Application on the mobile device). A user may enter an email address and password to register as a user of the Application. Once a user is registered, their data will be stored in the Application on the mobile device as well as in the database associated with the Application and System. In this way, if a user changes phones, the user is not required to re-register in the Application. After entering their email and password into the Registration interface, the user can select "Next" to advance to the Login interface.

FIG. 1B illustrates an exemplary Login interface for the Application. The Login interface is provided to users following successful registration via the Registration interface shown in FIG. 1A. If the user has already registered within the Application, but the user is not currently logged into the Application, the Application will prompt the user for their email and password that were used to register the user with the Application. If the user has not previously logged out of the Application, their email and password are stored in the Application and they will not be prompted with the Login interface. Once a user has entered their email and password in the Login interface, the Application will prompt the user to select "Next" to advance to the Home Page.

FIG. 1C illustrates an exemplary Home Page interface for the Application. The Home Page interface is provided to users following successful entry of Login credentials (e.g., email and password) to the Application. The Home Page interface is also displayed if the user has already registered and is still logged into the Application. The Home Page interface provides access to the Training and Courses functionality, via icons or other similar graphical affordances enabling user access to the functionality associated with the icon or affordance. For example, if the user selects "Training" the Application will advance to the Training interface and allow the user to browse and/or select training materials. Similarly, if the user selects "Courses" the Application will advance to the Courses interface and allow the user to browse and/or select courses. The Home Page interface also includes access to a System Menu interface. For example, the System Menu interface can be accessed via an icon or other similar graphical affordance, such as icon 105 shown in FIG. 1C. A user may access the System Menu by selecting, clicking or touching icon 105 to advance to the System Menu interface.

FIG. 1D illustrates an exemplary System Menu interface. The System Menu interface allows a user to logout of the Application and to restore purchases. The Logout functionality enables a user to end their session of engagement with the Application and exits the Application. The Restore Purchases functionality enables a user to restore previous purchases. For example, in the case where the user may have deleted the Application from their mobile device or internet connected device and re-installed the application or the user has acquired a new phone and has installed the Application on the new phone, the Restore Purchases functionality allows the user to re-download Application data (e.g., courses, training materials) from the System database for use in the current Application installation.

Figure 2B:
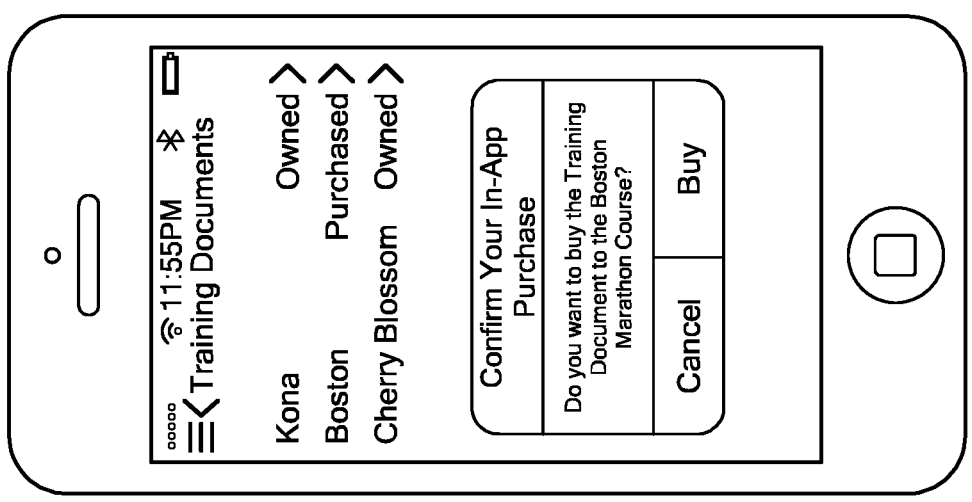
Figure 2A:
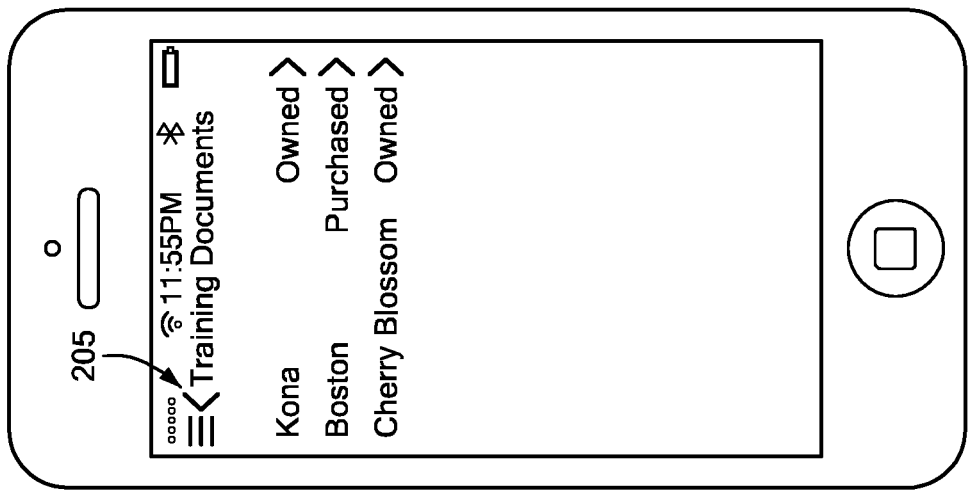

FIGS. 2A-2C illustrate example interface implementations of the Training functionality that is available within the Application. FIGS. 2A-2C illustrate example interfaces of the Training Document Overview interface, the Purchase Training Document interface, and the Training Document Detail interface, respectively. FIG. 2A illustrates an exemplary Training Document Overview interface. The Training Document Overview interface is displayed when the user selects the Training icon from the Home Page interface, as shown in FIG. 1C. The Training Document Overview interface may also include a "Back" icon (e.g., icon 205) or similar graphical affordance to allow the user to navigate to the Application Home Page. The Training Document Overview interface lists the available training documents and allows users to select one for viewing. A user may select a training document and if the user has already purchased the selected training document, the Application will advance to the Training Document Detail interface that is associated with the selected training document. If the user has not yet purchased the selected training document, an interface will be presented allowing the user to purchase the selected training document.

FIG. 2B illustrates an exemplary Purchase Training Document interface. The Purchase Training Document interface may be a separate interface (not shown) navigable from other locations in the Application or may be a "pop-up" interface provided to the user atop the Training Document interface as shown in FIG. 2B. As shown in FIG. 2B, the Purchase Training Document interface is displayed to allow the user to purchase a training document. For example, Application implementations configured on the Apple iOS operating system wherein users utilize a mobile or internet-connected device manufactured by Apple, Inc., of Cupertino, Calif., the Purchase Training Document interface may utilize the standard purchasing methods provided by Apple. If the purchase is successful, the purchased Training Document Detail interface displays the selected Training Document. If the purchase is not successful, the Application returns the user to the Training Document Overview interface. For example, if a user has successfully purchased the Boston Marathon Training Document, the Application will enable the user to view the Training Document associated with the Boston Marathon.

FIG. 2C illustrates an exemplary Training Document Detail interface. The Training Document Detail interface is displayed for users who have selected and successfully purchased a training document. As shown in FIG. 2C, the user has successfully purchased the Boston Marathon Training Document and views the training document in the Training Document Detail interface. The Training Document Detail interface identifies course specific training advice corresponding to the course the user has selected for training. The Training Document Detail interface also includes a "Back" icon or other similar graphical affordance (e.g. icon 210) enabling the user to navigate to the Training Document Overview interface.

Figure 3C:
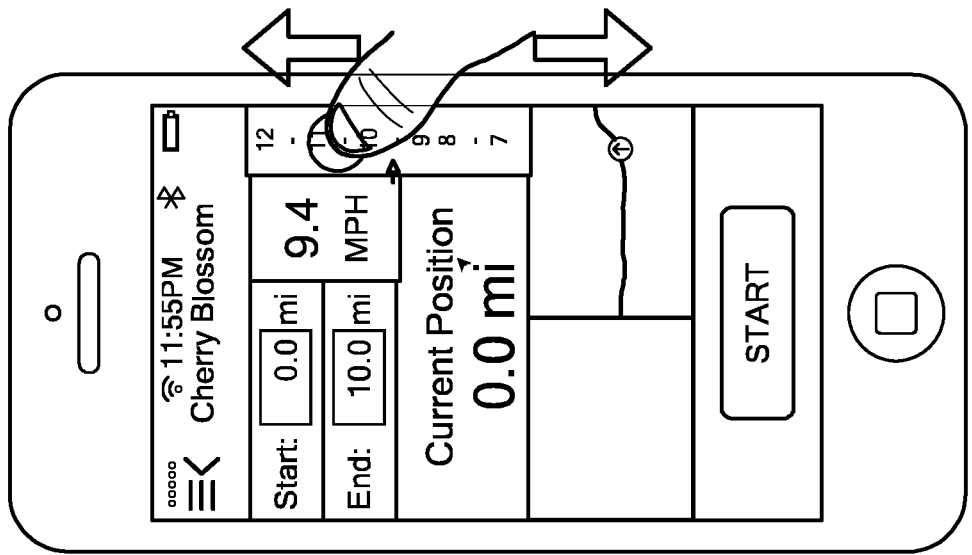
Figure 3B:
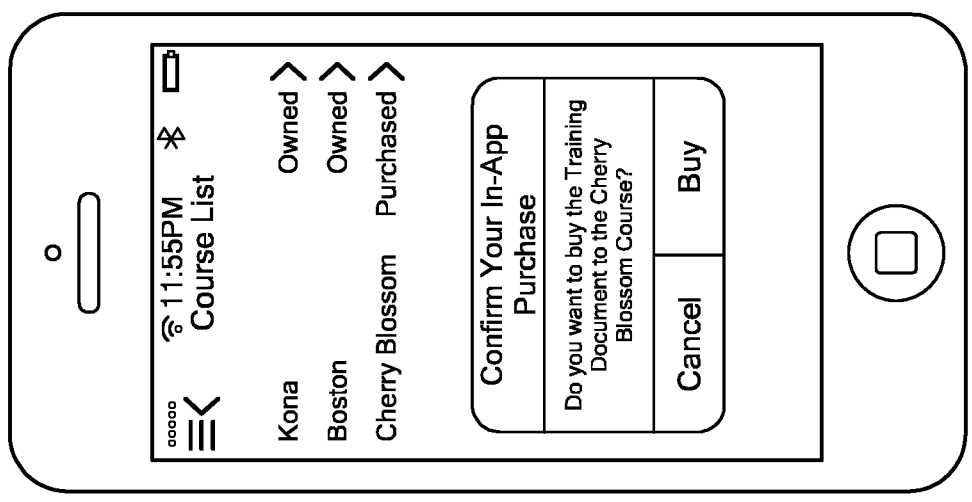
Figure 3A:
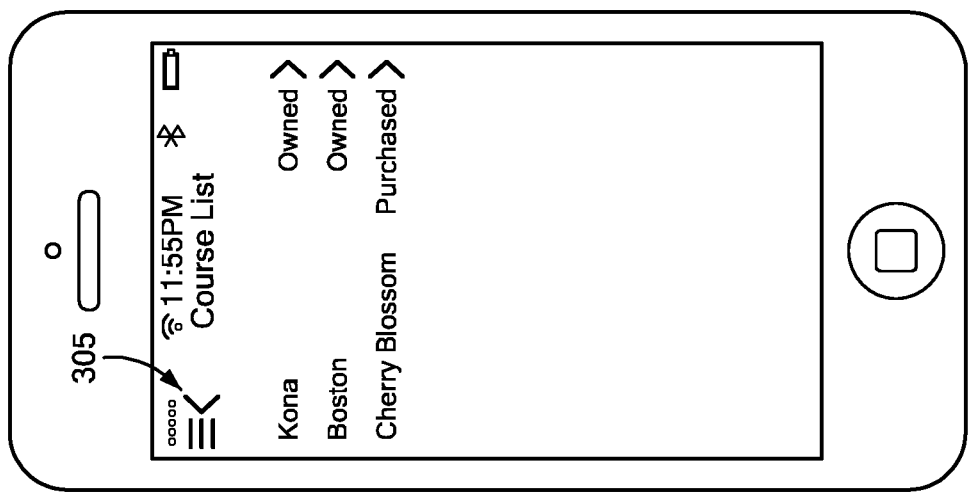

FIGS. 3A-3H illustrate example interface implementations of the Courses functionality that is available within the Application. FIGS. 3A-3H illustrate example interfaces of the Course Overview interface, the Purchase Course interface, the Active Course interface, the Active Course-Update Start/End interface, the Active Course—Updated interface, the Active Course-Running interface, the Active Course-Elevation Up/Down interface, and the Active Course-Paused interface, respectively. FIG. 3A illustrates the Course Overview interface that is accessed from the Application Home Page interface. The Course Overview interface lists the available training courses and allows users to select one for training. A user may select a course and if the user has already purchased the selected course, the Application will advance to the Active Course interface that is associated with the selected course. If the user has not yet purchased the selected course, an interface will be presented allowing the user to purchase the selected course. The Course Overview interface may also include a "Back" icon (e.g., icon 305) or similar graphical affordance to allow the user to navigate to the Application Home Page.

FIG. 3B illustrates an exemplary Purchase Course interface. The Purchase Course interface may be a separate interface (not shown) navigable from other locations in the Application or may be a "pop-up" interface provided to the user atop the Course Overview interface as shown in FIG. 3B. As shown in FIG. 3B, the Purchase Course interface is displayed to allow the user to purchase a course for training. For example, Application implementations configured on the Apple iOS operating system wherein users utilize a mobile or internet-connected device manufactured by Apple, Inc., of Cupertino, Calif., the Purchase Course interface may utilize the standard purchasing methods provided by Apple. If the purchase is successful, the purchased course is presented to the user in the Active Course interface. If the purchase is not successful, the Application returns the user to the Course Overview interface. For example, if a user has successfully purchased the Cherry Blossom course, the Application will enable the user to view the Course associated with the Cherry Blossom course in the Active Course interface.

FIG. 3C illustrates an exemplary Active Course interface. The Active Course interface is displayed for users who have selected and successfully purchased a course for training. As shown in FIG. 3C, the user has successfully purchased the Cherry Blossom course. A visual display of the course route and input mechanisms for the user to indicate the speed at which the user expects to train on the Cherry Blossom course are provided in the Active Course interface. The input mechanisms for the user to provide their desired training speed (in miles per hour or MPH) can include a slider or scrollable mechanism that are manipulated by touch allowing the user to select a specific speed (e.g., 9.4 MPH as shown in FIG. 3C). In some implementations, the user may provide verbal input to the Active Courses interface to input their desired training speed. The Active Course interface provides the primary functionality for the engaging the runner using Application. The Active Course interface displays the position of the user along the course route. The user can select the starting point and end point using the interface input mechanisms. The user can begin the training run by selecting "START".

Figure 3E:
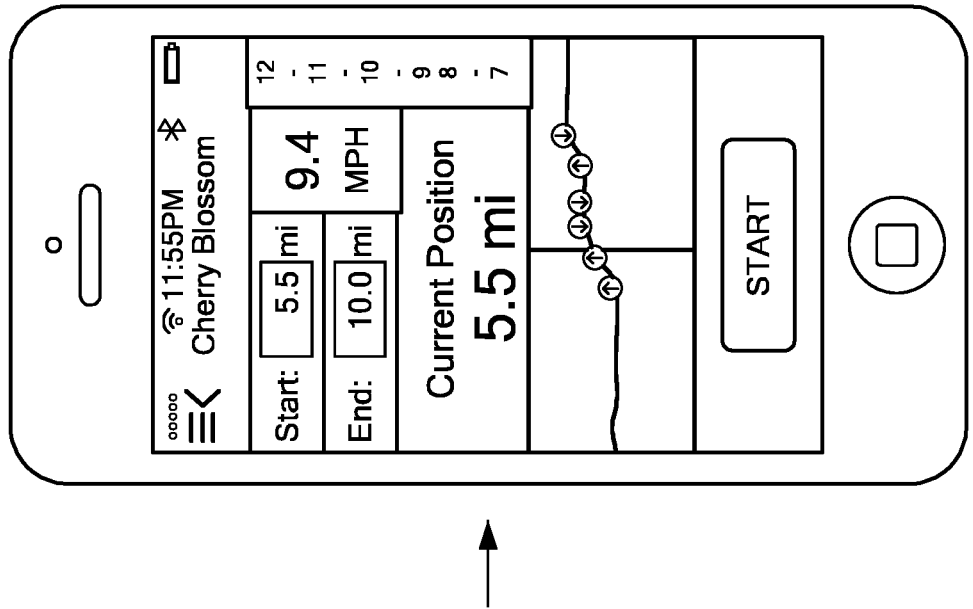
Figure 3D:
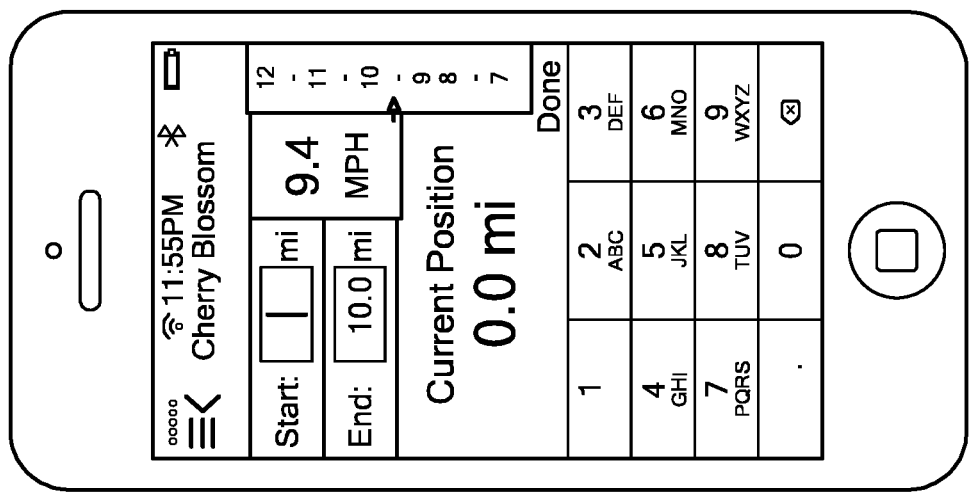

FIG. 3D illustrates an exemplary Active Course-Update Start/End interface. The Active Course-Update Start/End is displayed when the user selects taps or otherwise interacts with the input mechanisms of the Active Course interface to enter a starting point for their training run. For example, as shown in FIG. 3D, the user has chosen to input an updated starting point along the Cherry Blossom course. The user has provided their desired training speed of 9.4 MPH as input to the Active Courses interface and the setting remains displayed in the Active Course-Update Start/End interface. By tapping the "Start at:" input field, the user is enables to provide the application with input regarding the point at which they wish to start their training run. A numeric keypad may be provided for the user to input the starting point they wish to begin their training run from. Additionally, or alternatively, the Application may support voice or gesture based input mechanisms for entering the start or end points for the training run. Similarly, the user may input an updated end point along the Cherry Blossom course using input mechanisms similar to those used for identifying an updated starting point. When the user is satisfied with the starting and/or end points input to the Active Course-Update Start/End interface, the user selects "Done" to confirm the updates within the Application. Upon confirming the updates, the Application displays the Active Course-Updated interface.

FIG. 3E illustrates an exemplary Active Course-Updated interface. The Active Course-Updated interface is displayed after the user has entered an updated start and/or end point for the selected training course. The Active Course interface then displays the updated start (or end) point values and the current position data is reset to the starting point value entered by the user. The user has provided their desired training speed of 9.4 MPH as input to the Active Courses interface and the setting remains displayed in the Active Course-Updated interface. Upon receiving the user input to select the course starting point, the Active Course-Updated interface displays the course route in relation to the selected starting point and further displays indicators of elevation changes along the course where adjustments and/or setting changes will be required, when training on any treadmill, to simulate the elevation changes of the actual Cherry Blossom course. For example, the user has selected a starting point that is 5.5 miles into the Cherry Blossom course. The Active Course-Updated interface has been dynamically updated, based on the starting point input, and displays the course route from that point forward indicating points along the route where changes in elevation should be made. As shown in FIG. 3E, based on the selected starting point of mile 5.5 along the Cherry Blossom course, the user views two down arrow icons to indicate that two adjustments will be required at a future point along the route to decrease the treadmill elevation in order to accurately simulate the Cherry Blossom course conditions on any treadmill. As further shown in FIG. 3E, following the two adjustment indicators for decreasing the treadmill elevation, an adjustment indicator to increase the treadmill elevation occurs before the fourth adjustment indicator showing the user that an additional decrease of treadmill elevation is required to simulate the elevation changes of the actual Cherry Blossom course. To begin the training run from the selected starting point on the course, the user selects the "START" icon.

FIG. 3F illustrates an exemplary Active Course-Running interface. The Active Course-Running interface is displayed to users following selection of the START icon from the Active Course-Updated interface and is the primary interface the user will engage with while using the application during their training run. The user has provided their desired training speed of 9.4 MPH as input to the Active Courses interface and this setting can remain displayed in the Active Course-Running interface. After the user selects the START icon, (or the RESUME icon to be discussed later), the Active Course-Running interface displays the course route in relation to the selected starting point and further displays indicators of elevation changes (e.g., graphical icons such as "up" arrows or "down arrows" or other similar affordances indicating a course elevation change) along the course where adjustments and/or setting changes will be required, when training on any treadmill, to simulate the elevation changes of the actual Cherry Blossom course. The indicators of elevation changes will begin to move from right to left to indicate the application is operating properly. In this way, the runner sees their current position in relation to the indication of elevation change that is approaching. As described in relation to FIG. 3E, the Active Course-Running interface displays indicators or notifications of upcoming elevation adjustments or setting changes. The Active Course-Running display further indicates the elevation adjustments or setting changes that have already been made, for example by shading or some other graphical indicator that the adjustment has been performed by the user. The Active-Course Running interface may also include a "PAUSE" icon, which if selected by the user the Application will automatically pause the training run on the course. Additionally, or alternatively the user may pause the training run by engaging any other controls or input mechanisms on the Active Course-Running interface (e.g., the input fields for the start and end points). The Application displays the Active Course-Running interface until the Application determines that an adjustment and/or setting is required in order to continue accurately simulating the selected course.

FIG. 3G illustrates an exemplary Active Course-Elevation Up/Down interface. The user has provided their desired training speed of 9.4 MPH as input to the Active Courses interface and this setting remains displayed in the Active Course-Running interface. The Active Course-Elevation Up/Down interface also displays the course route in relation to the selected starting point and further displays indicators of elevation changes along the course where adjustments and/or setting changes will be required, when training on any treadmill, to simulate the elevation changes of the actual Cherry Blossom course. The Active Course-Elevation Up/Down interface is displayed to the user when the Application detects a significant change in elevation associated with the selected course. In this interface, the Application may display to the user a graphical icon or other similar affordance engaging the user to inform them of the elevation change that is required to accurately simulate the selected course. Upon receiving the notification, the user is expected to change the elevation setting on the treadmill where the selected course is being run. Additionally, or alternatively, the Application may emit a sound, a flash or any combination of visual and auditory cues to alert the runner of the required adjustment in treadmill elevation. For example, as shown in FIG. 3G, the runner has progressed to mile 5.7 of the Cherry Blossom course and reached a point in the course where an adjustment and/or setting change to elevation is required in order to accurately simulate the Cherry Blossom course conditions on any treadmill. The user is approaching the first of two down arrow icons shown on the course or route display indicating that the first of two adjustments will be required at a the current position of 5.7 miles into the Cherry Blossom course. The Application detects that an elevation adjustment in elevation is required and engages the user with a notification. The Active Course-Elevation Up/Down interface displays to the runner a notification of the "Elevation Change" and a "down" arrow to indicate elevation should be increased. Similarly, if the Application determines that a decrease in the treadmill elevation setting is required to continue accurately simulating the selected course, the Active Course-Elevation Up/Down interface would display a similar notification of an "Elevation Change" and an "up" arrow informing the runner to adjust the treadmill setting.

FIG. 3H illustrates an exemplary Active Course-Paused interface. The Active Course-Paused interface is displayed when the Active Course interface is paused. The user has the option to "RESTART" the run from the starting point input by the user (e.g., mile 5.5 of the Cherry Blossom course) or to "RESUME" the run from the point at which the Application was paused (e.g., mile 5.7 of the Cherry Blossom course). Additionally, or alternatively, the Active Course-Paused interface may also include additional icons or graphical affordances, such as a "Back" button, to navigate from the Active Course-Paused interface to the Course Overview interface listing the training courses available to the user for training. In some implementations, the Active Course-Paused interface may also include an icon or graphical affordance enabling users to stop, conclude or otherwise discontinue their training run on the course.

A system according to the present disclosure can include a secure "Back-end" portal that allows authorized owners and/or users of the system and application to record, upload, update, replace or delete Courses and users of the App. Additionally, the system and application Back-end can be configured to allow authorized users to record, upload, update, replace or delete training regimens and coaching data to the coaching component. The Back-end components of the system and application can be configured as a low-memory footprint, secure, web-application. Username and password protection are used for logging into the system and application to authenticate users. The Back-end can interact with a database to add, delete, and store user data, course data, equipment data and adjustment data. The Back-end functionality provides support for course terrain data in a GPS Exchange Format (".GPX") file format (also referred to as ".gpx", "GPX", or "gpx"). GPX is an XML (Extensible Markup Language) schema designed as a common GPS (Global Positioning System) data format for software applications. GPX files contain location data (and optionally elevation, time and other data) that is stored in tags and can be interchanged between GPS devices and software. A GPX file can include data associated with a course and can further include location data, elevation data and time data associated with intermediate course segments. The Back-end can also provide the owners with a facility to provide user support as necessary. Exemplary embodiments of the present disclosure utilize GPX files, however, other suitably similar file formats can be used within the scope of the present disclosure.

The system and application described herein can be implemented in a client server model. The application can be implemented as a client on a user's mobile device, smartphone or similar internet-connected device. For example, the application can be implemented using the mobile operating system iOS created and developed by Apple, Inc. of Cupertino, Calif. The system can be implemented as a server to process data received from the client device. For example, the system can be implemented on a server operating system, such as XAMPP which is an open source cross-platform web service solution stack package developed by Apache Friends. The system and application can support web browsers on the client device that are configured with HTML 5 or later and operate at a minimum internet connection speed of 256 kilobits/second (e.g., the internet connection speed most typically associated digital subscriber line technologies). The application can also be utilized in an off-line mode when the client device is not connected to the internet for training that is performed after a course has been downloaded on to the client device. The system can be configured on a web server platform such as Amazon Web Services, a subsidiary of Amazon.com offering on-demand cloud computing platforms. The system can further include a database server platform which can be configured as a relational database service such as the Amazon Relational Database Service offered by Amazon Web Services. The system and application can be configured to support a concurrent user load of 10 or more users simultaneously accessing data from the system via the application.

Figure 4:
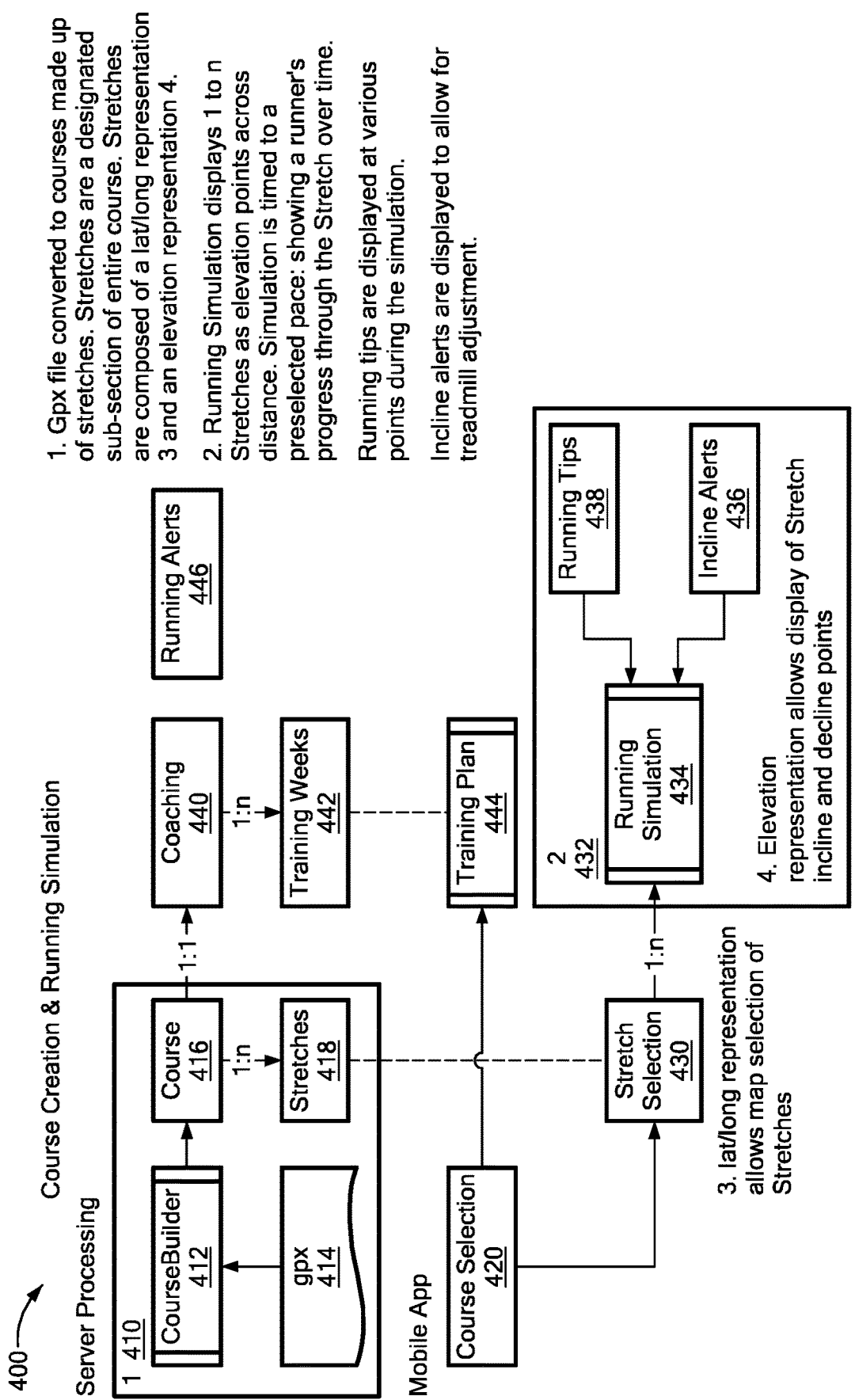
FIG. 4 depicts a further exemplary embodiment of a Course Creation and Running Simulation process flow in accordance with the present disclosure.

FIG. 4 depicts a further exemplary embodiment 400 of a Course Creation and Running Simulation process flow in accordance with the present disclosure. As shown, server processing block 410 can include a Course Builder 412 which receives an input file 414 (e.g., a .gpx file) representing a particular race course. A .gpx file can be converted to Courses 416 that are made up of Stretches 418 (or Segments). Stretches 418 are each a designated subsection of an entire course. Stretches are composed of latitude/longitude representation and an elevation representation. The Course Builder 412 can be resident on a server, e.g., a backend server. Based on, e.g., the input file, the Course Builder 412 designs or builds a Course 416, which is composed of a number (N) of Stretches 418. Any or all of the Stretches can be provided to a user's handheld device for use with the Mobile App. Using the Mobile App (e.g., resident on a handheld device), a user can perform a Course Selection 420 and for that selected Course further select any of the N associated Stretches by a Stretch (or Segment) selection 430. The user can select a Stretch based on latitude-longitude representation on a map displayed on the device screen.

Continuing with the description of FIG. 4, upon selection of a particular Stretch, the App provides a Running Simulation 432 for the user. The Running Simulation 432 preferably displays a screen 434 for the selected 1 to N Stretches as elevation points across or over distance. Simulation is timed to a pre-selected pace: showing a runner's progress through the Stretch over time. Running tips 438 can be displayed at various points during the simulation. Incline alerts 436 can be displayed to allow for treadmill adjustment.

Figure 5:
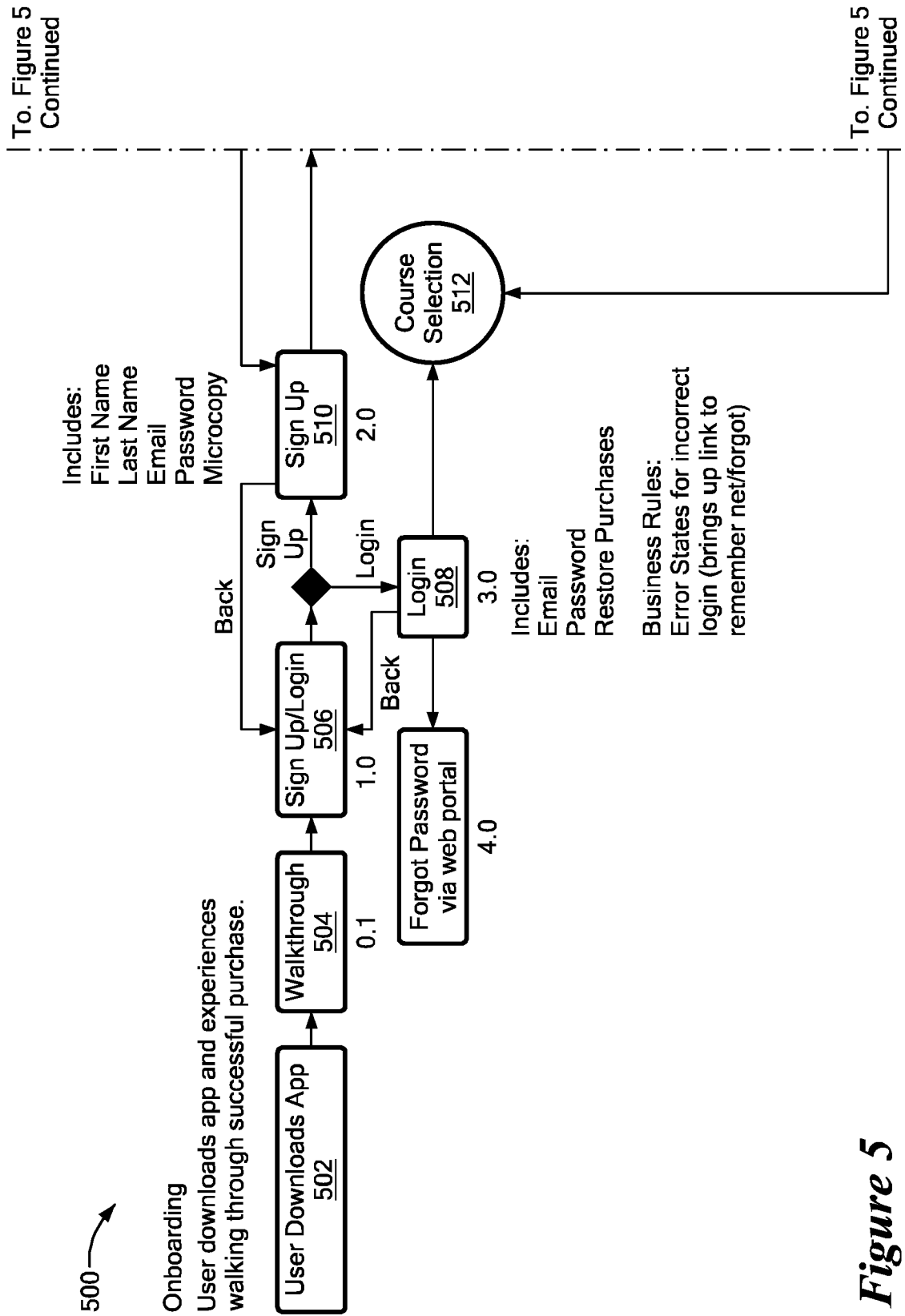
FIG. 5 depicts a further exemplary embodiment of a process flow for onboarding an application ("App") in accordance with the present disclosure. Through this process 500, a user can download the App and experience a successful walkthrough of the App and its features.

FIG. 5 depicts a further exemplary embodiment 500 of a process flow for onboarding an App in accordance with the present disclosure. As indicated, through this process 500 a user can download the App and experience a successful walkthrough of the App and its features. For the process, a user downloads the App (e.g., the Run Better App) to her or his portable device, e.g., smart phone such as an iPhone, as described at 502. The user then selects a walkthrough 504, as described at 504. Next a sign up/login screen is accessed, as described at 506. From the sign up/login screen, a user can login, as described at 508, or sign up, as described at 510. After logging in, a user can make a Course selection, as described at 512. After signing up, a user can receive confirmation of a successful purchase of the App; the user can subsequently, make a Course selection, as described at 512.

Figure 6:
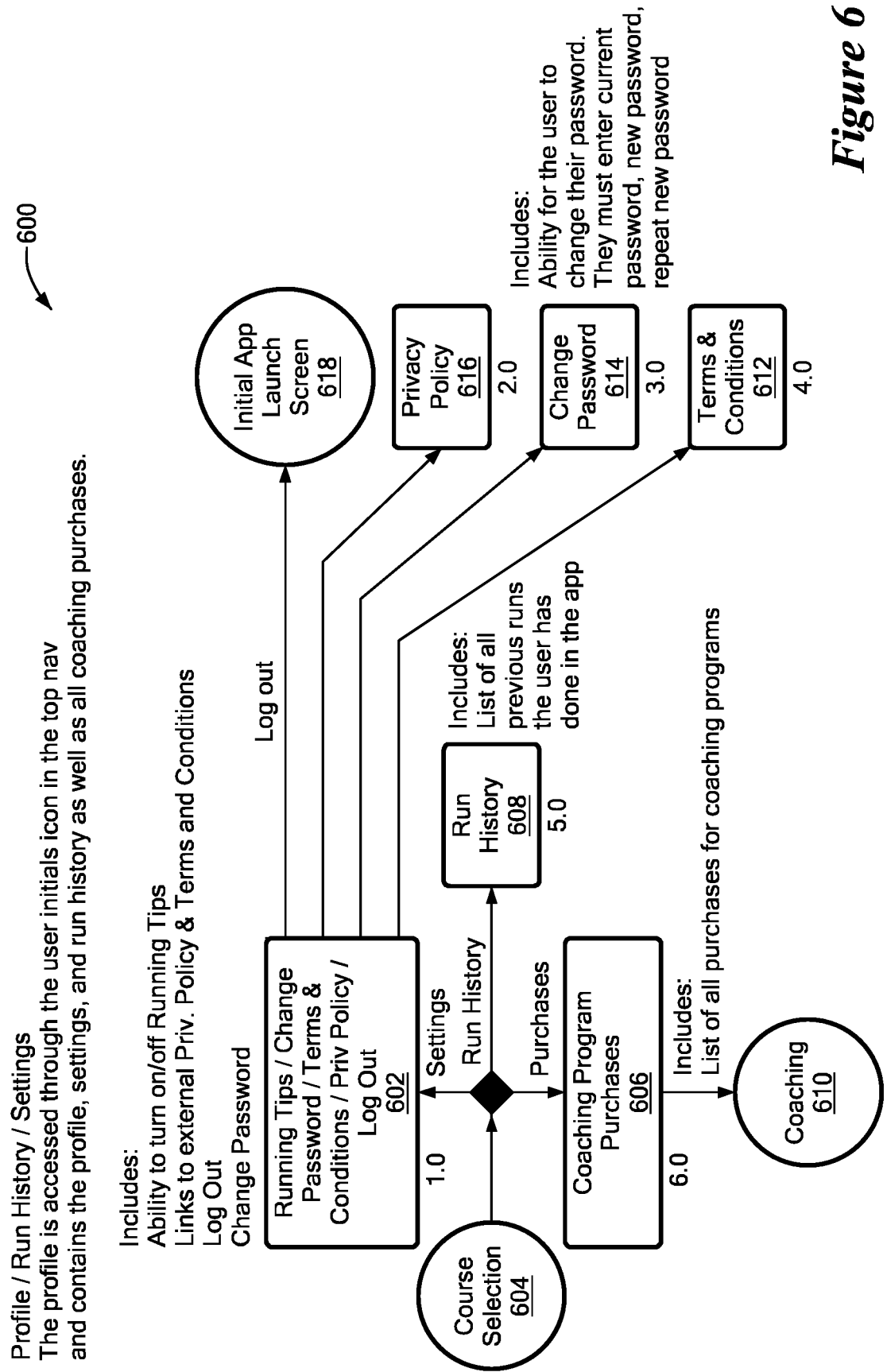
FIG. 6 depicts a further exemplary embodiment of a process flow for selecting or accessing a user's profile, run history, and settings in accordance with the present disclosure.

FIG. 6 depicts a further exemplary embodiment 600 of a process flow for selecting or accessing a user's profile, run history, and settings in accordance with the present disclosure. As indicated, a user can access his or her profile, e.g., through an initials icon, and the profile can contain the profile information/data, settings, and run history, as described at 602. The user can access a Course selection screen, as shown at 604. Preferably the profile also contains all coaching purchases made by the user, as described at 606. The user's run history can be accessed, as described at 608. A Coaching screen can further be accessed, as described at 610. An initial App launch screen can be accessed, as described at 618. Further screens can be accessed, including those for Privacy Policy (616), Change Password (614), and Terms and Conditions (612).

Figure 7:
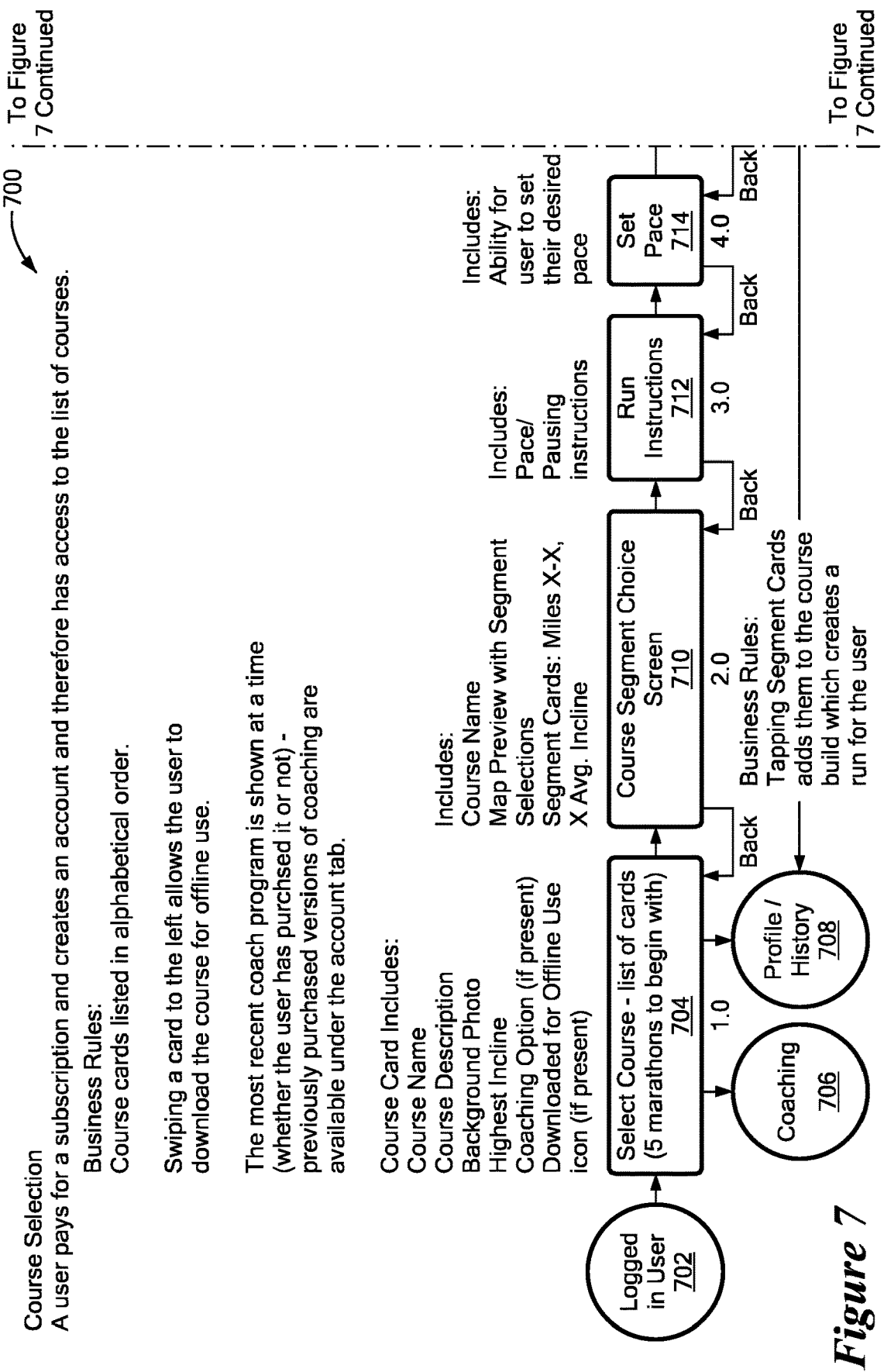
FIG. 7 depicts a further exemplary embodiment of a process flow for course selection in accordance with the present disclosure.
Figure 7:
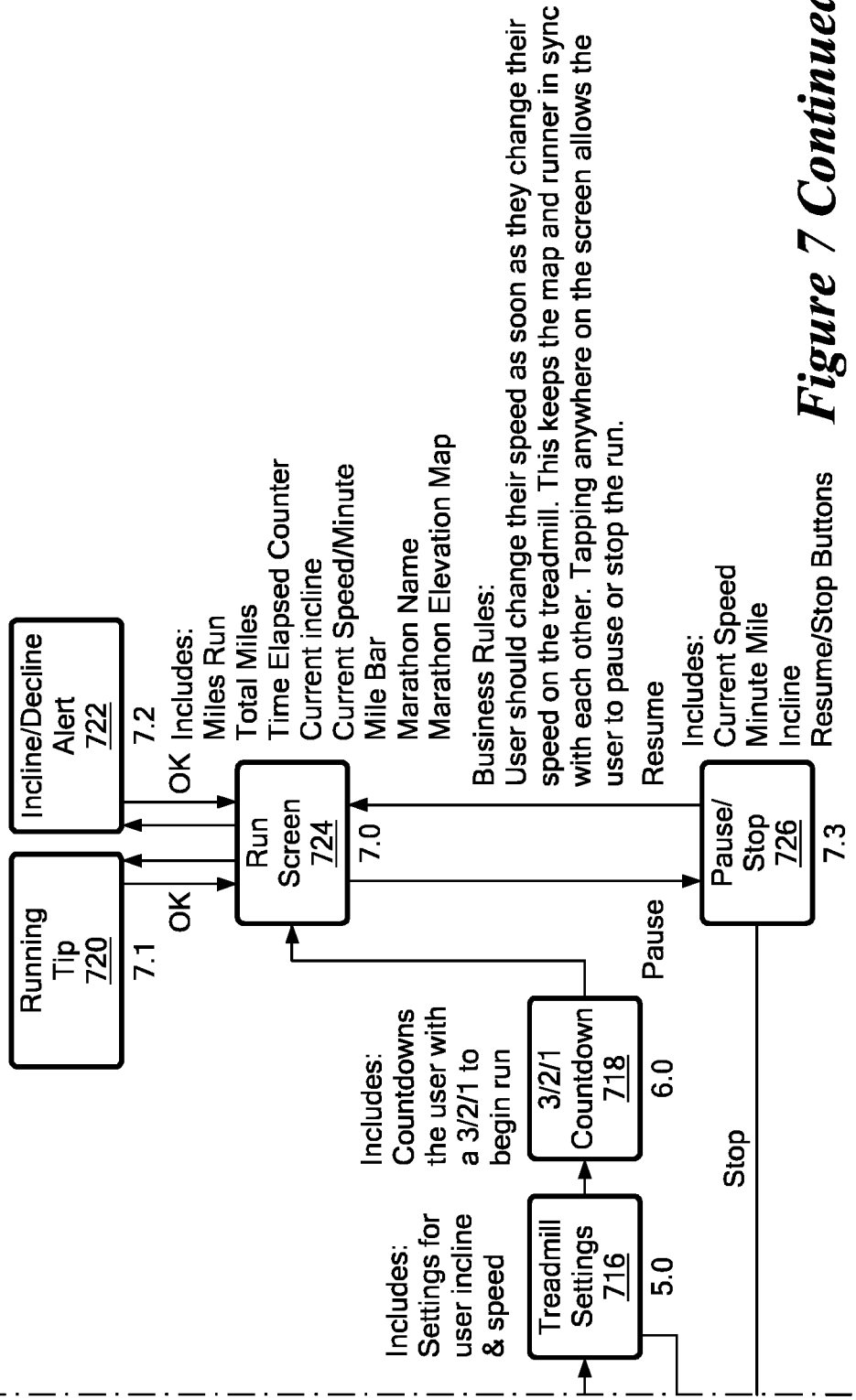

FIG. 7 depicts a further exemplary embodiment 700 of a process flow for course selection in accordance with the present disclosure. The user, once logged in as described at 702, has access via the App to a Course selection screen which enables the user to select a Course from a number, e.g., 5, of stored Courses, as described at 704. For example, the user could choose from a number of card icons, each listing a different marathon. A Course card preferably includes a Course name (e.g., Boston Marathon), a Course description, a background photo showing a portion or portions of the Course, a highest incline value, and optionally a Coaching option (if available or present) and a Downloaded for Offline Use icon (if available or present). Coaching (706) and Profile/History (708) can be available from the Course Selection screen. After Course selection, a Course Segment or Section Choice screen is made available to the user, as described at 710.

As further described at 710, a Course Segment Screen can include a Course name, a map preview with Segment Selections, and Segment cards which can list how long the segment is (e.g., in miles or kilometers) and an average or steepest incline (e.g., in a %). In preferred embodiments, a user adds a Segment card to the Course build by tapping the card. The Course build creates a Run for the user. Once the Course is built, the App can provide Run instructions to the user, as described at 712. The Run instructions can include pace and pausing instructions. A Set Pace screen can be accessed, as described at 714, which provides a user with the ability to set their desired pace. A Treadmill settings screen is also provided to the user, as described at 716, which displays incline values (e.g., in %, or the like) and speed values/readings to the user for adjusting the treadmill that is used. A Countdown screen is preferably present, as described at 718.

With continued reference to FIG. 7, process 700 further can include presenting a Run screen to the user, as described at 724. The Run screen can include or display miles run, total miles, a time elapsed counter, a current incline value, a current speed (e.g., designate distance per hour or minute, etc.), a mile bar, Course and/or Segment name (e.g., Boston Marathon or Heartbreak Hill), and a Course elevation map (e.g., an elevation map for the Boston Marathon). In use, the user can change their speed as soon as they change their speed on the treadmill. This can facilitate keeping the map and runner in sync with each other. In exemplary embodiments, the user can pause or stop the run by tapping anywhere on the screen. The user can also receive running tips, as described at 710. In preferred embodiments, the running tips occur at mile (or kilometer) markers and can be dismissed by the user tapping an "OK" symbol presented on the device screen. An Inclined/Decline alert can also be provided to the user, as described at 722. A Pause/Stop screen can be provided, as described at 726. The Pause/Stop screen can include current speed, minute mile (e.g., minutes per mile), incline, and Resume/Stop buttons (or similar features). A stop command can be stored in the user's Profile/History as shown by the connection between 726 and 708.

Figure 8:
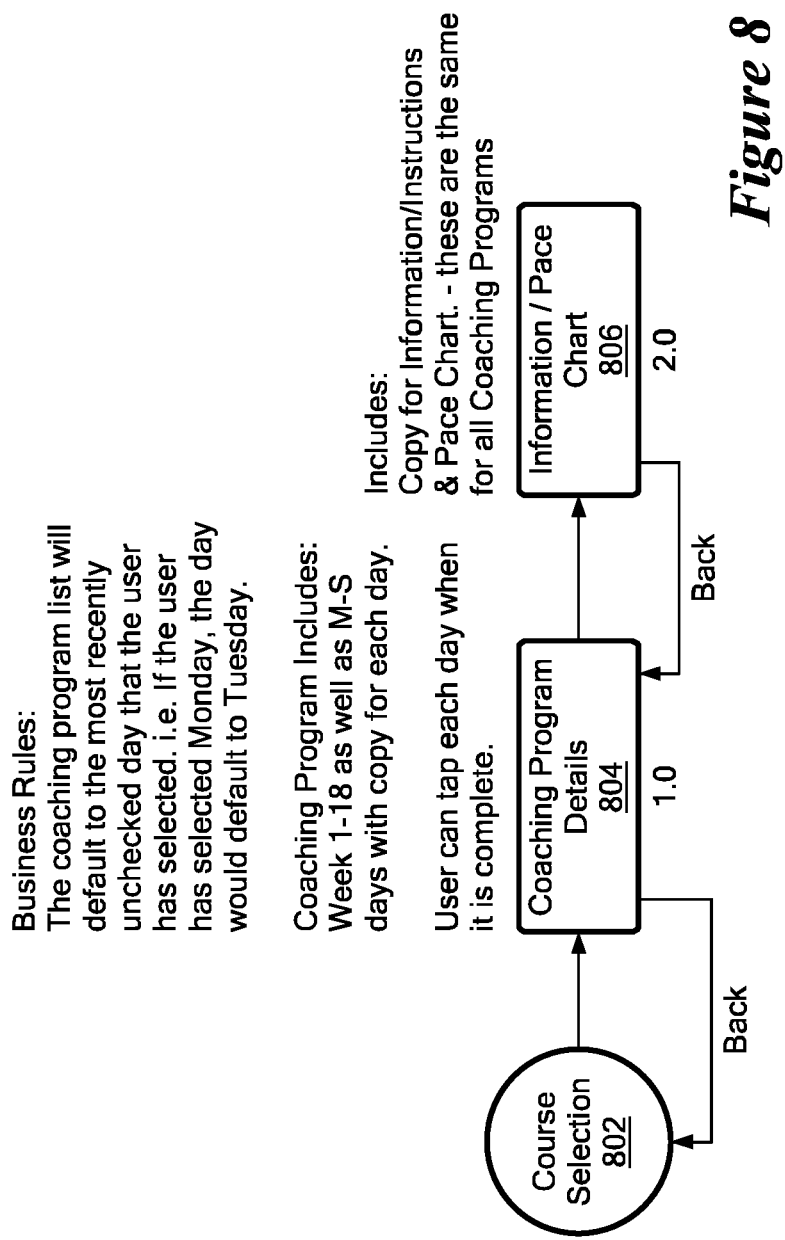
FIG. 8 depicts a further exemplary embodiment process flow for a user accessing coaching information in accordance with the present disclosure.

FIG. 8 depicts a further exemplary embodiment 800 process flow for a user accessing coaching information in accordance with the present disclosure. In preferred embodiments, a user has access to coaching as long as they have an App account and have paid for one-off (e.g., specifically tailored) coaching programs or regimens. As shown, after a Couse selection, described at 802, a User can access Coaching Program Details, as described at 804. A Coaching Program can be tailored to the individual user and/or a specific running event, e.g., a marathon. For example, a Coaching Program for training for a marathon could include Weeks 1-18 as well as M-S days (Monday through Sunday) of specific training instructions/advice, with a copy for each day. A user can tap each day when the training for it has been completed. In preferred embodiments, the Coaching Program list will default to the most recently unchecked day that the user has selected, e.g., if the user has selected Monday, the day would default to Tuesday. From the Coaching Program Details screen, a user can access or be provided with an Information/Pace Chart screen, as described at 806. The Information/Pace Chart screen can provide a copy of details of the Coaching Program, e.g., for Information/Instructions and a Pace chart; these can be the same for all Coaching Programs.

Figure 9:
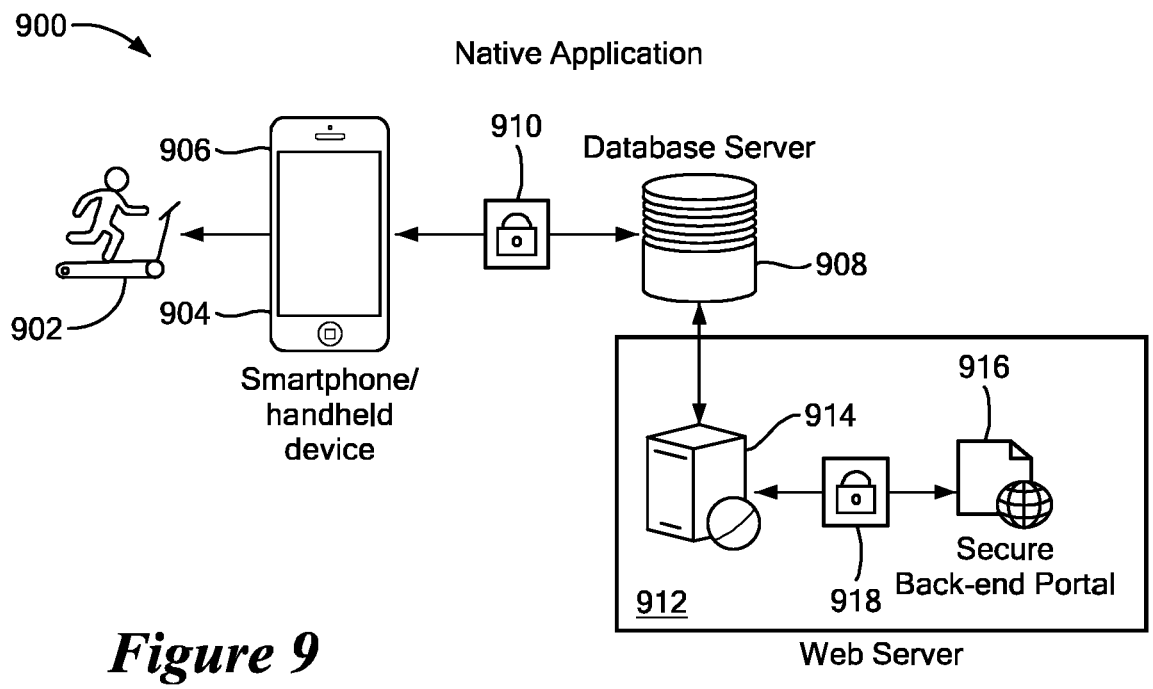
FIG. 9 a further exemplary embodiment implementing an App as a native application on a handheld device in accordance with the present disclosure.

FIG. 9 a further exemplary embodiment 900 implementing an App (e.g., a RunBetter App as described herein) as a native application on a handheld device in accordance with the present disclosure. As shown, a system 900 for running or using an App can include a treadmill 902 for use by the user. A smartphone/handheld device 904 can have an App 906 resident on it to provide the user with training and treadmill instructions. The smartphone/handheld device 904 and App 906 can be connected to a database server 908 via a secure connection 910 (e.g., a VPN, SSL, encrypted connection, or some other protected communication channel). The database server 908 can be connected to a Web Server 912, which can include a server 914 connected to a secure back-end portal 916 via a secure connection 918.

Figure 10:
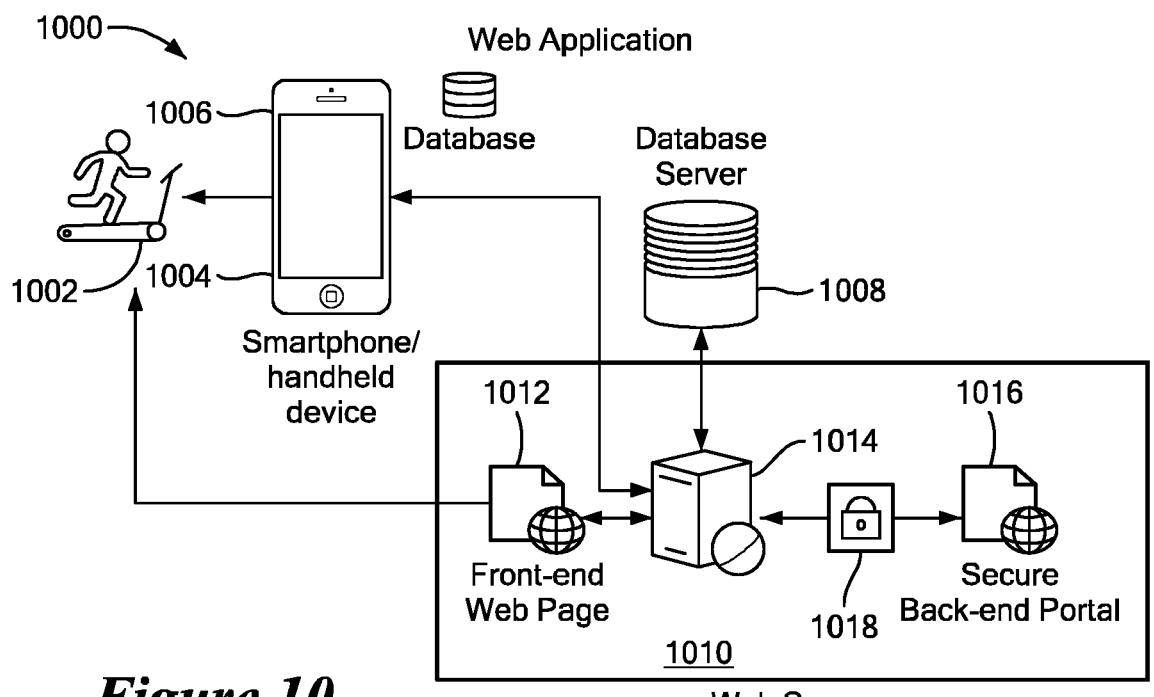
FIG. 10 depicts a further exemplary embodiment implementing an App as a web application in accordance with the present disclosure.

FIG. 10 depicts a further exemplary embodiment 1000 implementing an App (e.g., a RunBetter App as described herein) as a web application in accordance with the present disclosure. As shown, a system 1000 for running or using an App can include a treadmill 1002 for use by the user. A smartphone/handheld device 1004 can have an App 1006 resident on it to provide the user with training and treadmill instructions. The smartphone/handheld device 1004 and App 1006 can be connected to a Web Server 1010 including a server 1014 connected to a front-end web page that is accessible by the user. The server 1014 can be connected to a secure back-end portal via a secure connection 1018.

Figure 11:
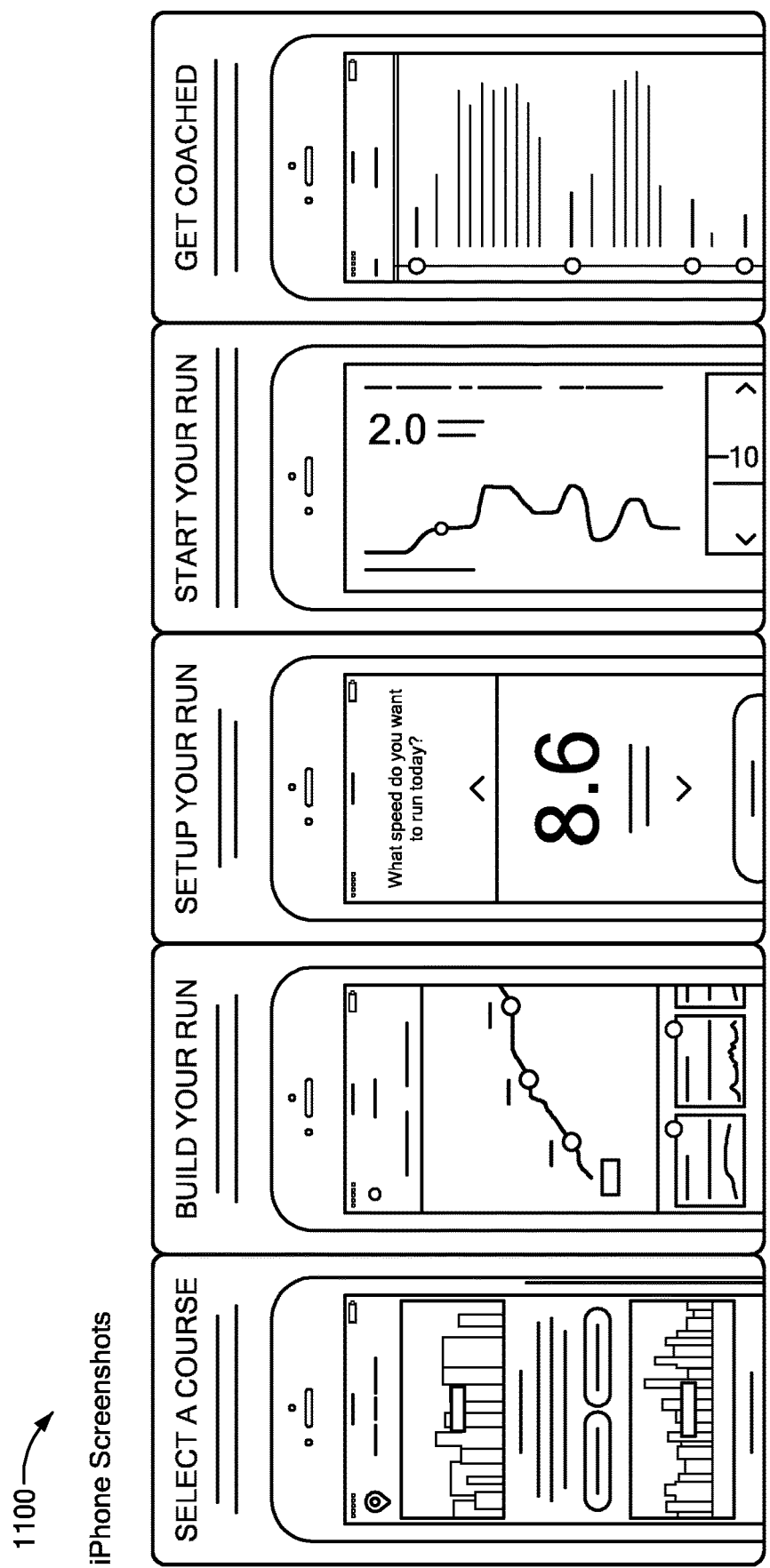
FIG. 11 depicts a set of alternate embodiments of exemplary App screen shots in accordance with the present disclosure.

FIG. 11 depicts a set 1100 of alternate embodiments of exemplary App screen shots in accordance with the present disclosure.

Exemplary Embodiments

Examples of the subject technology can be embodied or implemented in a software application (hereinafter, "APP" or "App"). The APP can be used with any treadmill and requires no special treadmill. The APP can be resident (stored or used on) on a runner's phone (smart device), that holds the course data (e.g., latitude/longitude, incline, decline information, etc.) and it is the APP that tells the runner (not the treadmill) how to manually adjust the treadmill to mimic the course. With the APP, a runner need not find any specific treadmill. The runner can instead use any treadmill she or he can find that has an incline function. It can be any one of the, e.g., 40+ treadmills at a gym (of varying brands), the old but still functioning treadmill in a runner's basement, or any random treadmill at any hotel anywhere in the world, etc. No special treadmill is required. No waiting in line. The APP travels with the runner. This is a simple tool that can be used with any treadmill. The APP takes a course from anywhere, extrapolates the course data into the APP and allows a runner to download/purchase it and manually adjust the treadmill to mimic the course terrain. It essentially remanufactures a run from a real world run to a treadmill run. Another key differentiator (of the APP vs prior approaches) is that by allowing the runner to manually adjust any treadmill, the runner will have control and can decide whether to bother with minimal inclines/minor changes along the course, or not. But, the data will be available. The runner can further control their run within the data the APP provides. A key differentiator is that instead of trying to connect the phone to the exercise device, the APP is the exercise device in that it tells the runner how to use the treadmill. The APP communicates with the runner, not the treadmill. The APP can be made available to anyone with a suitable portable electronic device, e.g., an iPhone, Galaxy, or similar handheld device. This caters to runners who don't belong to fancy gyms with expensive treadmills.

Embodiments of the APP can incorporate a voice component, where a voice in the APP tells the runner when and how to adjust the incline decline, and where the runner is along the course. This could be beneficial give the (relatively small) size of the screens of many handheld devices, e.g., iPhone screens.

The APP is geared toward engaging the runner, and having the runner actually focus on what they are doing (i.e., race specific training, in most cases, discussed below). This APP is primarily designed for runners who want to improve as a runner. This is geared towards a more serious, more hard core runner.

The APP: The APP does not rely on any video component. This APP is not geared toward showing a runner the course surroundings. Instead, the APP tells the runner how to adjust the treadmill manually to closely approximate (reproduce) actual, felt running conditions (e.g., exertion level over time) for a particular running course (e.g., the Boston Marathon). A runner using the APP instead will be focused on making adjustments during his or her run to mimic a course's elevation in an effort to train and prepare for a specific course, not to hop on a treadmill for visual entertainment. The APP is geared towards a runner who wants to engage in specific training for a specific race.

Although a video component is not required for the APP, examples of the APP can include a map component, so that while running the runner can track a dot on a map so the runner can see where the runner is along the course. This could be a bird's eye view or an elevation view, for example. This would be similar to what one sees on their iPhone screen when viewing driving directions, and where their car is in relation to their starting point and destination point. But, no video is required.

The APP: the APP can include running workouts and running (training/coaching) programs tailored specifically for someone who wants to run a specific race. Again, race specific training. The running programs can be offered for varying durations/training periods (e.g., for a marathon distance, possibly a 3-month or 6 month-programs), or it could include stand-alone workouts geared towards preparing a runner for a specific (e.g., notoriously difficult) portion of a race course (e.g., the infamous Heartbreak Hill of the Boston Marathon). Aside from the obvious, this could give runners a psychological boost come race day, knowing that they trained as closely as possible to the actual race course. Runners will feel like they have a leg up on other runners toeing the line. Furthermore, the programs for each race would be different, so that runners know they are getting a specific program geared towards a specific race (i.e., getting something different with each race). Also, the workouts/training programs would be created be elite runners, designing programs to improve and prepare athletes as runners in particular. It is not on simply providing run workouts as High Intensity Interval Training (known as "HIIT" training), for example.

Example 1

A runner could decide he/she wants to train for the Boston Marathon. They can buy the course and, by using the APP, they can at any time, get on any treadmill, anywhere, and run the toughest hill of the Boston Marathon, Heartbreak Hill. In addition, the runner could purchase a three month training program (written by an actual, bona-fide, elite runner and coach) (cf., Jillian Michaels) geared specifically for preparing a runner for the Boston Marathon. The exercise programs of the APP might include, for example, 5 runs each week, but only some of which are on a treadmill, but each treadmill run would use the APP to mimic specific portions of the course. Other runs of the week could be run outdoors, or on the treadmill (following the marathon course or not), as the runner chooses. This race specific training is not obvious in the prior art.

Example 2

Suppose a high school or college cross country coach is preparing his runners for a meet on a course at a distant location ("Course A") that neither the coach nor any of the team runners has ever seen, and Course A is too far away from the team's hometown for the coach or any team member to train on Course A. Using the APP, via crowd sourcing, a runner near Course A could go out and run (or even drive) Course A, submit it to the APP, the APP would then convert the course data into incline and decline equivalents for use on a treadmill that the runners can use to train for Course A. Yet another option is for the coach to take the data from Course A (via the APP) and then submit to the APP data from a course in the team's hometown, and the App would convert this course data into incline and decline equivalents. The coach could then compare his local course to Course A, and identify which parts of his local course most closely mimic Course A, so that the team can actually train outdoors, on portions of a local course that most closely mimic Course A. Accordingly, this APP is not limited to treadmill running, but actually allows people to use it outdoors too.

The APP: The APP can incorporate crowd sourcing, which can enable runners from any extended geographic area (e.g., around the country, or around the world, etc.) to submit to the APP any run from any location for conversion by our APP, which then can be downloaded and used by other runners anywhere, whether on a treadmill, or in the manner described above involving the cross country coach (by finding similar terrain in their own location). With crowd sourcing, runners can submit course (race and non-race) data and over time that data can be built/amassed into a significant library (the key is that the course can be from any course that any runner runs, anywhere). In this way, examples of the APP do not need to rely on, e.g., the race/race directors of a specific race course. Examples of the APP can instead rely on crowd sourcing for course data. This functionality can present a key feature for coaches to train their athletes (e.g., high school, college, post college amateur and elite runners), who are very interested in collecting, reviewing and analyzing data in an effort maximize training for their athletes. Coaches can identify hilly terrain/locations that a runner can train on and then give the data to their coach. This can also allow friends, for example, who do not live in the same city but who are training for the same marathon who want to run the race together, to actually have similar training (so that come race day they are similarly trained/prepared and actually can run together. As another example, suppose a runner is going to Hawaii and wants to tackle a specific/popular course there. In anticipation of their trip, they could purchase the course from the APP (which course would be submitted by a completely unknown runner via crowd sourcing), and the APP would give the Hawaii-bound runner the data they need to train for that specific course. This certainly would be useful to runners everywhere, and is not obvious in the prior art.

Some examples of the APP can be implemented as an internet version of the APP to collect as much data as possible from crowd sourcing.

Examples of the APP can be a source for good runs in a specific area for people who travel. Suppose you are traveling to Virginia and you want suggestions for a good 5 mile route or a 10 mile route. With crowd sourcing, runners from Virginia could post suggestions for runs for the traveler to implement via the APP.

Examples of the APP can incorporate a "social feed" (e.g., a webpage with a forum) to allow runners to communicate with other runners about their runs. Essentially, a runners' community internet site can be used by examples of the APP as a component of the APP (but the training component comes first). The social feed could initially be limited to text and maybe a screen shot of the mileage or part of the course a runner has run. This would allow runners to interact, support, and compare with one another. This would also allow the runners to begin networking so that they want to share their information and can compete against one another on various courses. This can also allow the APP to incorporate the runs of well-known runners (e.g., Olympians) for runners using the APP to compare themselves (see further discussion about this below).

The APP: Examples of the APP can provide a way to connect a runner with other runners, including elite runners, so that runners can compare their specific runs to other, specific runners (not "ghosts"). For example, one or more of the many well-known elite runners that are household names to anyone who takes running fairly seriously, or who even reads Runner's World magazine (these elite runners often 'grace' the covers or are the feature of a multiple page story within the magazine). For example, an elite runner can provide her run data from a race, or any random run she did on any day of the week in her home town, and then make it available on our APP to other runners, for comparison. This would allow a runner to compare his or her run to any random 10 miler the elite runner ran on any given day. Suppose the APP has the elite runner's GPS (e.g., a Garmin device such as a Fenix watch) data from the New York marathon, or a point to point course in her hometown. A runner could download the elite runner's data, and then get on a treadmill and run essentially the same course, and compare him or herself to the elite runner, and the elite runner in the APP is the "ghost". This same kind of thing could be done with friends who live miles apart but who want to "train" together. Runner A gives her friend Runner B a course Runner A did, and Runner B can run the essentially the same run and they can compare their runs. This option can allow runners of all levels to connect with fellow runners and also with elite runners, thereby creating an on-line running community. A runner could decide he wants to run "against" X on a certain day, and the runner would be able to do that. The X could be an amateur runner the runner doesn't know, a friend, or an elite runner. This concept is not rendered obvious in any of the prior art.

Race Courses: Examples of the APP can have multiple, e.g., five or more (5+), races that can be downloaded to instruct a runner how to adjust the incline/decline on any treadmill to mimic any part of the course. The multiple races, can, for example, include (but are not limited to) the following: Boston Marathon, New York Marathon, Tucson Marathon, Austin Marathon, Kona (run/marathon portion of the Hawaii Ironman World Championship Triathlon), and the Cherry Blossom 10 Miler (Washington, D.C.)

Training Options: Examples of the APP can offer one or more workouts and training programs specific to each race. For example, it would include individual workouts that are separate from any particular program, which are designed to prepare a runner for a particular course, using the APP data, on a treadmill to incorporate hilly portions of the course. And, the training programs would include, for example, 3- and/or 6-month training programs designed specifically to train a runner for a specific race for which data is provided in the APP, and at least one run per week would be performed on a treadmill, using the APP data, to mimic specific parts of the selected course. Training programs could be designed based on a number of factors, one of which could be a runner's goal time (e.g., the runner wants to run a 3:00 marathon, at Boston).

Further Exemplary Embodiments (A) A computing device including:
a touchscreen having a touchscreen user interface;
one or more processors;
memory; and
one or more programs, wherein the one or more programs are stored in the memory and configured to be executed by the one or more processors, the one or more programs including:
instructions for:
monitoring a user input area of a touchscreen user interface;
from the user input area, receiving a user indication that a certain Course is selected for simulation;
in response to the user selection indication, importing a number of Sections of the Course to the computing device for displaying in the user interface;
from the user input area, receiving a user indication that a certain Section is selected for simulation; and
displaying the selected Section in the user interface as elevation points across distance of the selected Section.

(B) A non-transitory, tangible, computer-readable storage medium containing a program of instructions that causes a computer system having a processor running the program of instructions to:
monitor a user input area of a touchscreen user interface;
from the user input area, receive a user indication that a certain Course is selected for simulation;
in response to the user selection indication, import a number of Sections of the Course to the computing device for displaying in the user interface;
from the user input area, receive a user indication that a certain Section is selected for simulation; and
display the selected Section in the user interface as elevation points across distance of the selected Section.

(C) A computer-implemented method utilizing a touchscreen for simulating a race course and instructing a user as to how to adjust a treadmill to mimic terrain of the race course, the method including:
monitoring a user input area of a touchscreen user interface;
from the user input area, receiving a user indication that a certain Course is selected for simulation;
in response to the user selection indication, importing a number of Sections of the Course to the computing device for displaying in the user interface;
from the user input area, receiving a user indication that a certain Section is selected for simulation; and
displaying the selected Section in the user interface as elevation points across distance of the selected Section.

The subject matter in the following clauses can be implemented with any or all of clauses (A), (B), and (C) above.

Each Section can include or provide a latitude/longitude representation and an elevation representation. The instructions can further include instructions for displaying an inclination setting for a treadmill to correspond to a Section (or Segment) of a Course. The Course can include crowd-sourced data. The displayed Section comprises crowd-sourced data. The selected Course includes data from a GPX file. The instructions can further include instructions for providing one or more running tips to the user for running the selected Course. The instructions can further include instructions for presenting an Incline/decline alert to the running during running of the Course on the treadmill. The instructions can further include instructions for receiving pace/pause instructions from the user via the touchscreen. The instructions can further include instructions for providing coaching details to the user via the user interface.

The components, steps, features, objects, benefits and advantages which have been discussed are merely illustrative. None of them, or the discussions relating to them, are intended to limit the scope of protection in any way. Numerous other embodiments are also contemplated. These include embodiments which have fewer, additional, and/or different components, steps, features, objects, benefits and advantages. These also include embodiments in which the components and/or steps are arranged and/or ordered differently.

For example, while various embodiments have been described herein in the context of a smart device utilizing an iOs operating system, embodiments of the present disclosure are not limited to such and may be implemented on or in devices utilizing other operating systems, e.g., an Android operating system.

Unless otherwise indicated, the mobile applications that have been discussed herein are implemented with a specially-configured computer or computing system, e.g., mobile device, specifically configured to perform the functions that have been described herein for the applications. Each computer system or device can include one or more processors, tangible memories (e.g., random access memories (RAMs), read-only memories (ROMs), and/or programmable read only memories (PROMS)), tangible storage devices (e.g., hard disk drives, CD/DVD drives, and/or flash memories), system buses, video processing components, network communication components, input/output ports, and/or user interface devices (e.g., keyboards, pointing devices, displays, microphones, sound reproduction systems, and/or touch screens).

Each computer system or device may include software (e.g., one or more operating systems, device drivers, application programs, and/or communication programs). When software is included, the software includes programming instructions and may include associated data and libraries. When included, the programming instructions are configured to implement one or more algorithms that implement one or more of the functions of the computer system, as recited herein. The description of each function that is performed by each computer system also constitutes a description of the algorithm(s) that performs that function. Any suitable programming language may be used for such software and application (Apps); suitable examples include, but are not limited to C, C++, C#, Java, Python, R, PHP, JavaScript, Ruby, Go, Ladder Logic, HTML and bash, and the like.

The software may be stored on or in one or more non-transitory, tangible storage devices, such as one or more hard disk drives, CDs, DVDs, and/or flash memories. The software may be in source code and/or object code format. Associated data may be stored in any type of volatile and/or non-volatile memory. The software may be loaded into a non-transitory memory and executed by one or more processors.

Unless otherwise stated, all measurements, values, ratings, positions, magnitudes, sizes, and other specifications which are set forth in this specification are approximate, not exact. They are intended to have a reasonable range which is consistent with the functions to which they relate and with what is customary in the art to which they pertain. All articles, patents, patent applications, and other publications which have been cited are hereby incorporated herein by reference in their entirety.

What is claimed is:

1. A handheld device for providing a user with instructions to adjust settings of a given treadmill to simulate a desired terrain Course for the user while on the treadmill, the device comprising:
   a user interface adapted to the handheld device and including a touchscreen having a user input area;
   a memory including computer-readable instructions; and
   a processor coupled to the memory and operative to execute the computer-readable instructions, the computer-readable instructions causing the processor to perform actions including:
   monitoring the user input area of the touchscreen user interface;
   from the user input area, receiving a user indication that a certain Course is selected, as selected Course, for simulation;
   in response to the user selection indication of the selected Course, importing a plurality of Sections of the selected Course to the handheld device for displaying in the user interface;
   from the user input area, receiving a user indication that a certain Section of the plurality of Sections is selected, as a selected Section, for simulation;
   displaying the selected Section, as a displayed Section, in the user interface as elevation points across distance of the selected Section; and
   displaying instructions to the user in the user interface for the user to manually adjust settings of the treadmill to simulate the displayed Section of the selected Course for the user while using the treadmill.

2. The handheld device of claim 1, wherein each Section comprises a latitude/longitude representation and an elevation representation.

3. The handheld device of claim 1, wherein the instructions further comprise instructions for displaying an inclination setting for a treadmill to correspond to a selected Section.

4. The handheld device of claim 1, wherein the Course comprises crowdsourced data.

5. The handheld device of claim 1, wherein the displayed Section comprises crowdsourced data.

6. The handheld device of claim 1, wherein the selected Course includes data from a GPX file.

7. The handheld device of claim 1, wherein the instructions further comprise instructions for providing one or more running tips to the user for running the selected Course.

8. The handheld device of claim 1, wherein the instructions further comprise instructions for presenting an Incline/decline alert to the user during running of the Course on the treadmill.

9. The handheld device of claim 1, wherein the instructions further comprise instructions for receiving pace/pause instructions from the user via the touchscreen.

10. The handheld device of claim 1, wherein the instructions further comprise instructions for providing coaching details to the user via the user interface.

11. The handheld device of claim 1, wherein the computer-readable instructions further comprise instructions for providing the user with voice instructions to adjust settings of the treadmill.

* * * * *